(12) United States Patent
Sperry et al.

(10) Patent No.: US 8,020,358 B2
(45) Date of Patent: Sep. 20, 2011

(54) APPARATUS AND METHOD FOR FORMING INFLATED CONTAINERS

(75) Inventors: Laurence B. Sperry, Newton, MA (US); Eric A. Kane, Lynn, MA (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 1309 days.

(21) Appl. No.: 10/979,583

(22) Filed: Nov. 2, 2004

(65) Prior Publication Data

US 2006/0090421 A1    May 4, 2006

(51) Int. Cl.
B65B 43/02 (2006.01)
B65B 31/00 (2006.01)

(52) U.S. Cl. .......................................... 53/403; 53/562

(58) Field of Classification Search ............ 53/403, 53/370.1, 79, 455, 562, 459, 568, 468, 469, 53/385.1, 370, 472, 284.7
See application file for complete search history.

(56) References Cited

U.S. PATENT DOCUMENTS

| | | |
|---|---|---|
| 2,265,075 A | 12/1941 | Knuetter |
| 2,718,105 A | 9/1955 | Ferguson et al. |
| 3,196,068 A | 7/1965 | Schoder et al. |
| 3,209,513 A | 10/1965 | Cochrane |
| 3,319,538 A | 5/1967 | Bodolay et al. |
| 3,462,913 A | 8/1969 | Bodolay et al. |
| 3,546,433 A | 12/1970 | Johnson |
| 3,596,428 A | 8/1971 | Young et al. |
| 3,660,189 A | 5/1972 | Troy |
| 3,735,551 A | 5/1973 | Pratt |
| 3,901,759 A | 8/1975 | Highfield et al. |
| 3,938,298 A | 2/1976 | Luhman et al. |
| 4,017,351 A | 4/1977 | Larson et al. |
| 4,096,306 A | 6/1978 | Larson |
| 4,169,002 A | 9/1979 | Larson |
| 4,201,031 A | 5/1980 | Wiles |
| 4,384,442 A | 5/1983 | Pendleton |
| 4,448,011 A | 5/1984 | Pohl |
| 4,509,820 A | 4/1985 | Murata et al. |
| 4,512,136 A | 4/1985 | Christine |
| 4,545,180 A | 10/1985 | Chung et al. |
| 4,631,901 A | 12/1986 | Chung et al. |
| 4,654,878 A | 3/1987 | Lems |
| 4,674,268 A | 6/1987 | Gavronsky et al. |
| 4,847,126 A | 7/1989 | Yamashiro et al. |
| 4,869,048 A | 9/1989 | Boeckmann |
| 4,893,453 A | 1/1990 | Weikert |
| 4,999,975 A | 3/1991 | Willden et al. |
| 5,032,212 A | 7/1991 | Campbell |

(Continued)

FOREIGN PATENT DOCUMENTS

DE    199 13 408 A1    3/1999

(Continued)

*Primary Examiner* — Rinaldi I. Rada
*Assistant Examiner* — John Paradiso
(74) *Attorney, Agent, or Firm* — Thomas C. Lagaly

(57) ABSTRACT

An apparatus for forming inflated containers from a film web having two juxtaposed film plies includes:
  a. a mechanism that conveys the film web along a path of travel;
  b. a first sealing device for producing one or more seals that bond the film plies together to form a container having at least one opening;
  c. an inflation assembly for inflating the container by directing a stream of gas into the opening thereof; and
  d. a second sealing device for sealing closed the opening of the inflated container.

25 Claims, 26 Drawing Sheets

U.S. PATENT DOCUMENTS

| | | | |
|---|---|---|---|
| 5,042,663 A | 8/1991 | Heinrich |
| 5,067,301 A | 11/1991 | Shore |
| 5,070,675 A | 12/1991 | Chuan-Shiang |
| 5,080,747 A | 1/1992 | Veix |
| 5,181,365 A | 1/1993 | Garvey et al. |
| 5,187,917 A | 2/1993 | Mykleby |
| 5,210,993 A | 5/1993 | Van Boxtel |
| 5,216,868 A | 6/1993 | Cooper et al. |
| 5,246,527 A | 9/1993 | Bjorkman et al. |
| 5,254,074 A | 10/1993 | Landers et al. |
| 5,337,539 A | 8/1994 | Barton |
| 5,339,602 A | 8/1994 | Landers et al. |
| 5,353,573 A | 10/1994 | Durrant |
| 5,355,656 A | 10/1994 | Perrett |
| 5,357,733 A | 10/1994 | Weikert |
| 5,411,625 A | 5/1995 | Focke et al. |
| 5,427,830 A | 6/1995 | Pharo |
| 5,441,345 A | 8/1995 | Garvey et al. |
| 5,454,642 A | 10/1995 | De Luca |
| 5,552,003 A | 9/1996 | Hoover et al. |
| 5,581,983 A | 12/1996 | Murakami |
| 5,660,662 A | 8/1997 | Testone |
| 5,679,208 A | 10/1997 | Sperry et al. |
| 5,687,545 A | 11/1997 | Baker |
| 5,693,163 A | 12/1997 | Hoover et al. |
| 5,699,653 A | 12/1997 | Hartman et al. |
| 5,722,217 A | 3/1998 | Cloud |
| 5,733,045 A | 3/1998 | Jostler et al. |
| 5,755,082 A | 5/1998 | Takahashi et al. |
| 5,778,641 A * | 7/1998 | Simionato ................... 53/551 |
| 5,824,392 A | 10/1998 | Gotoh et al. |
| 5,845,463 A | 12/1998 | Henaux |
| 5,862,653 A | 1/1999 | Solano |
| 5,873,215 A | 2/1999 | Aquarius et al. |
| 5,875,610 A | 3/1999 | Yuyama et al. |
| 5,918,441 A | 7/1999 | Baker |
| 5,937,614 A | 8/1999 | Watkins et al. |
| 5,942,076 A | 8/1999 | Salerno et al. |
| RE36,501 E | 1/2000 | Hoover et al. |
| 6,035,611 A | 3/2000 | Lerner |
| 6,058,681 A | 5/2000 | Recchia, Jr. |
| RE36,759 E | 7/2000 | Hoover et al. |
| 6,145,273 A | 11/2000 | Baker |
| 6,174,273 B1 | 1/2001 | Harding |
| 6,209,286 B1 | 4/2001 | Perkins et al. |
| 6,357,211 B1 | 3/2002 | Flesch |
| 6,367,230 B1 * | 4/2002 | Fukuda ........................... 53/451 |
| 6,375,785 B1 | 4/2002 | Aquarius |
| 6,410,119 B1 | 6/2002 | De Luca et al. |
| 6,427,425 B1 * | 8/2002 | Nakagawa et al. ............. 53/551 |
| 6,453,644 B1 | 9/2002 | Baker |
| 6,460,313 B1 | 10/2002 | Cooper |
| 6,550,229 B2 | 4/2003 | Sperry et al. |
| 6,581,360 B1 * | 6/2003 | Hirsh et al. ..................... 53/551 |
| 6,582,800 B2 | 6/2003 | Fuss et al. |
| 6,605,169 B2 | 8/2003 | Perkins et al. |
| 6,635,145 B2 | 10/2003 | Cooper |
| 6,651,406 B2 * | 11/2003 | Sperry et al. ................... 53/403 |
| 6,659,150 B1 | 12/2003 | Perkins et al. |
| 6,761,960 B2 | 7/2004 | De Luca et al. |
| 6,786,022 B2 | 9/2004 | Fuss et al. |
| 6,804,933 B2 * | 10/2004 | Sperry et al. ................... 53/403 |
| 2002/0108352 A1 | 8/2002 | Sperry et al. |
| 2002/0166788 A1 | 11/2002 | Sperry et al. |
| 2004/0206050 A1 | 10/2004 | Fuss et al. |
| 2005/0188659 A1 | 9/2005 | Lerner et al. |
| 2006/0086064 A1 | 4/2006 | Wehrmann |
| 2006/0090421 A1 | 5/2006 | Sperry et al. |
| 2006/0174589 A1 | 8/2006 | O'Dowd |

FOREIGN PATENT DOCUMENTS

| | | |
|---|---|---|
| DE | 199 13 410 A1 | 3/1999 |
| EP | 1 340 687 | 9/2003 |
| FR | 991 671 | 10/1951 |
| FR | 2157760 | 10/1971 |
| FR | 2537914 | 12/1982 |
| GB | 1063119 | 12/1964 |
| JP | 07 041051 | 2/1995 |
| WO | 00/53501 | 3/2000 |
| WO | 00/43198 | 7/2000 |
| WO | 00/64672 | 11/2000 |
| WO | 00/78522 A1 | 12/2000 |
| WO | 01/53153 A1 | 7/2001 |
| WO | 01/74686 A2 | 10/2001 |
| WO | 01/85434 A2 | 11/2001 |
| WO | 02/14156 A1 | 2/2002 |
| WO | 03/086742 A1 | 10/2003 |

* cited by examiner

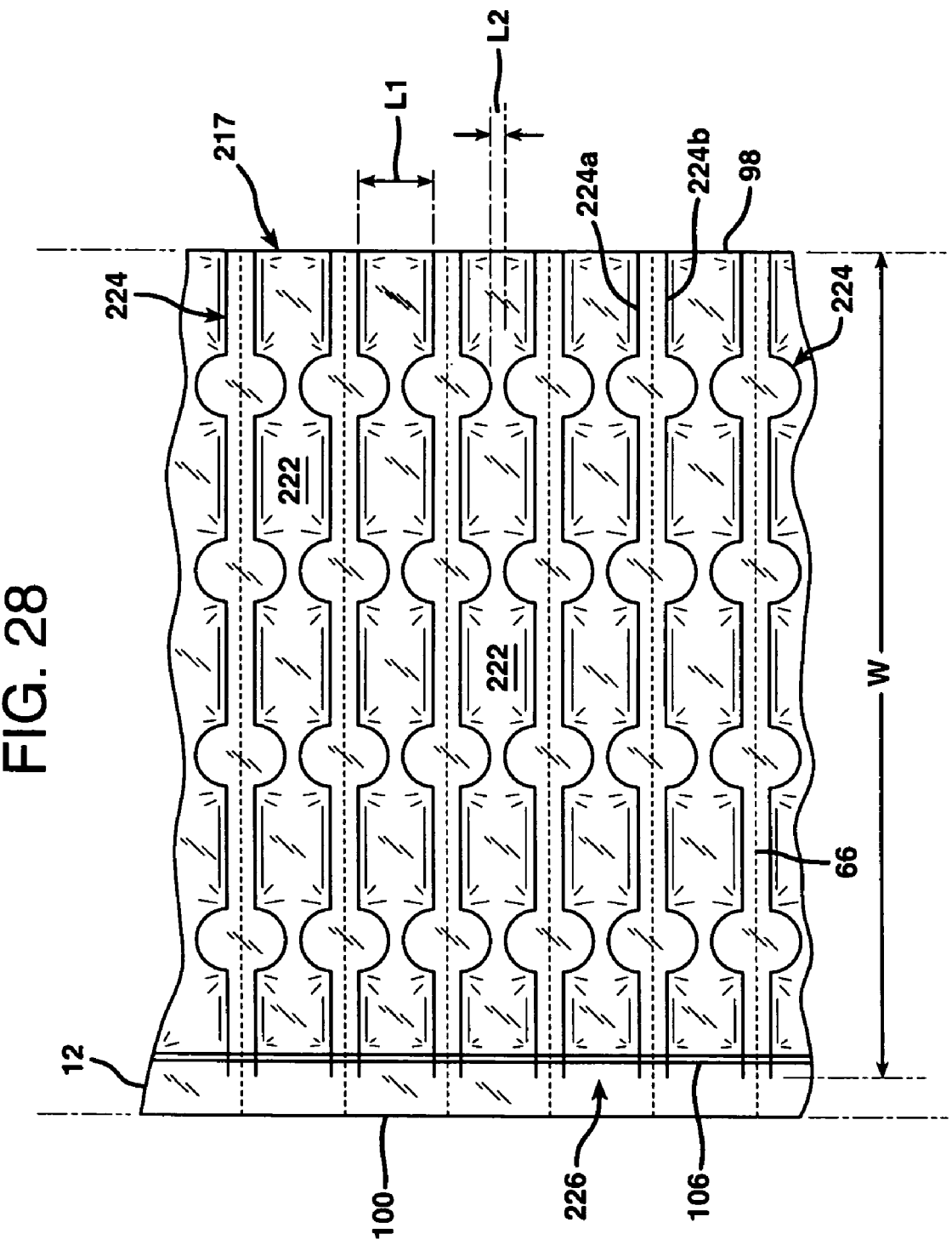

APPARATUS AND METHOD FOR FORMING INFLATED CONTAINERS

BACKGROUND OF THE INVENTION

The present invention relates to inflated containers and, more particularly, to a simplified and improved apparatus and process for producing gas-inflated cushions for packaging.

Various apparatus and methods for forming inflated cushions or pillows are known. Such inflated containers are used to package items, by wrapping the items in the cushions and placing the wrapped items in a shipping carton, or simply placing one or more inflated containers inside of a shipping carton along with an item to be shipped. The cushions protect the packaged item by absorbing impacts that may otherwise be fully transmitted to the packaged item during transit, and also restrict movement of the packaged item within the carton to further reduce the likelihood of damage to the item.

Conventional machines for forming inflated cushions tend to be rather large, expensive and complex, and produce cushions at a rate which is slower than would be desired. While smaller, less-expensive inflation machines have been developed more recently, such machines generally make only one cushion-size at a time, i.e., they are not capable of producing adjacent cushions having different dimensions from the same web of film, because such machines generally operate with film webs having pre-formed containers. That is, the speed and relative simplicity of such smaller, less-complex inflation machines generally relies on the use of inflatable film webs in which much of the container-producing operation has been performed prior to placement on the machine, so that the inflation machine simply inflates and seals the pre-formed containers. The disadvantage of this approach is that the pre-formed containers have a predetermined size. Thus, if different-sized cushions are desired, a different inflatable web must be installed on the machine, which results in the interruption of the cushion-making operation. Even then, it is still not possible to produce adjacent cushions of different sizes on a real-time basis.

Accordingly, there is a need in the art for a simpler and less expensive apparatus for producing gas-filed packaging cushions, yet one that also produces cushions at a relatively high rate of speed and has the ability to produce cushions of various sizes on a real-time basis.

SUMMARY OF THE INVENTION

Those needs are met by the present invention, which, in one aspect, provides an apparatus for making inflated containers from a film web having two juxtaposed film plies, comprising:

a. a mechanism that conveys the film web along a path of travel;

b. a first sealing device for producing one or more seals that bond the film plies together to form a container having at least one opening;

c. an inflation assembly for inflating the container by directing a stream of gas into the opening thereof; and d. a second sealing device for sealing closed the opening of the inflated container.

Significantly, the first sealing device moves with the film web and produces the seals as the web is conveyed along the travel path. In this manner, container-size can be varied as desired without having to change film rolls, with no sacrifice in production speed. Moreover, the movable sealing device allows inflated containers of varying dimension to be produced, so that two or more adjacent containers in the film web can have different dimensions. Compound cushions comprising two or more inflated containers of two or more different sizes can thereby be produced.

Another aspect of the invention is directed to a device for producing a longitudinal seal between two juxtaposed plies of film that are conveyed along a longitudinal path of travel, wherein the juxtaposed film plies include a series of containers therebetween. The device comprises:

a. a sealing mechanism that forms a sealing zone in the travel path in which the longitudinal seal is produced; and b. a pressure mechanism that forms a pressure zone in the travel path in which the juxtaposed film plies are compressed. The pressure zone is positioned between the containers and the sealing zone to substantially isolate the containers from the sealing zone. Such isolation has been found to result in superior longitudinal seals.

A further aspect of the invention is directed to an apparatus for making inflated containers from a film web as described above, except that the first sealing device produces a series of transverse seals that bond the film plies together to form containers having a predetermined transverse width, wherein such containers have at least one change in longitudinal dimension along their transverse width.

These and other aspects and features of the invention may be better understood with reference to the following description and accompanying drawings.

BRIEF DESCRIPTION OF THE DRAWING

FIG. 28 is a perspective view of a cushion produced from the device illustrated in FIG. 27.

DETAILED DESCRIPTION OF THE INVENTION

Figure 1:
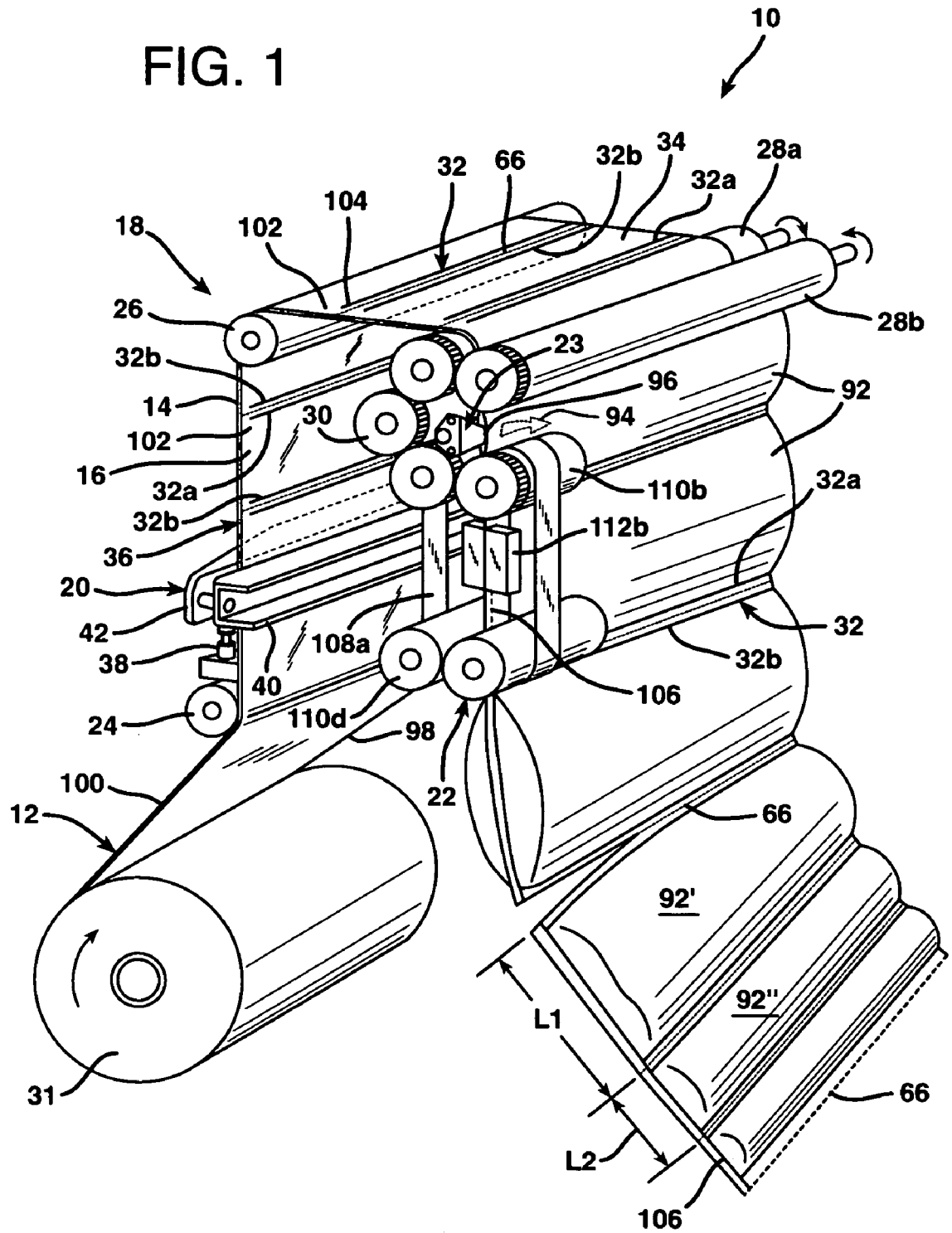
FIG. 1 is a schematic perspective view of an apparatus for forming inflated containers, e.g., inflated cushions, in accordance with the present invention.

FIGS. 1-4 illustrate an apparatus 10 for making inflated containers from a film web 12 having two juxtaposed film plies 14 and 16. Such inflated containers may be used as cushions, e.g., for packaging and protecting articles during shipment and storage. Other uses for the inflated containers are also envisioned, e.g., as floatation devices or decorative articles. Apparatus 10 generally includes a conveying mechanism 18, a first sealing device 20, a second sealing device 22, and an inflation assembly 23.

Conveying mechanism 18 conveys film web 12 along a path of travel through apparatus 10 as shown. The "path of travel" (or "travel path") of film web 12 simply refers to the route that the film web traverses while being conveyed through the apparatus, as indicated by the shape assumed by the film web due to the manipulation thereof by the conveying mechanism. Conveying mechanism 18 may include various conventional film-guide and film-drive devices as desired, such as guide rollers 24, 26 and nip rollers (also known as driver rollers) 28a, b. Nip rollers 28a, b may be driven by motor 30 as shown. Film web 12 may be supplied from any suitable source, such as a supply roll 31, from which the film may be unwound and pulled into apparatus 10 via conveying mechanism 18.

First sealing device 20 produces one or more seals 32 that bond the film plies 14, 16 together to form a container 34 having at least one opening 36. Seals 32 produced by first sealing device 20 preferably are transverse heat seals, i.e., are oriented in a direction that is substantially transverse, i.e., at an angle, to the direction of film movement along its travel path through apparatus 10. The spacing between such transverse seals 32, therefore, determines the length dimension of each container. Accordingly, a series of containers 34 may be formed by forming a series of the transversely-oriented seals 32 via first sealing device 20.

Advantageously, first sealing device 20 is a movable sealing device, which is capable of moving with the film web 12 as the web is conveyed along its travel path, e.g., by attaching itself to the web. In this manner, the film web may continue moving at a constant speed through the apparatus 10 while seals 32 are formed. With conventional 'form-fill' inflation devices, the film web has to be intermittently stopped to produce transverse seals, which reduces the rate at which containers can be formed. In accordance with the present invention, however, the film web 12 continues to move along the travel path without stopping as the first sealing device 20 produces the seals 32. Accordingly, even though the apparatus 10 produces seals 32 on a real-time basis, i.e., does not rely on a film web having pre-formed seals (pre-formed containers) but, instead, produces transverse seals as part of the inflation process, the sealing process does not slow down the overall rate of speed at which the apparatus produces containers. This is because the first sealing device 20 is movable and moves at the same rate as the rate at which the conveying mechanism 18 causes the film web 12 to move through the apparatus 10. Thus, cushion-size can be varied as desired without having to change film rolls, with no sacrifice in production speed. Moreover, as will be explained in further detail below, apparatus 10 is capable of producing inflated containers of varying dimension, such that two or more adjacent containers in the film web have different dimensions. In this manner, cushions comprising two or more inflated containers of two or more different sizes can be produced.

FIGS. 1-4 illustrate a typical cycle through which the first sealing device 20 moves as it completes a seal. This cycle will be briefly described, followed by a more detailed description of the structural components that are depicted.

In FIG. 1, sealing device 20 is at the starting point in the cycle, wherein it is resting atop bottom stops 38 (only one shown in FIGS. 1-4) with clamping members 40 and 42 in the 'open,' i.e., non-clamped position. Clamping members 40, 42 are components of sealing device 20.

Figure 2:
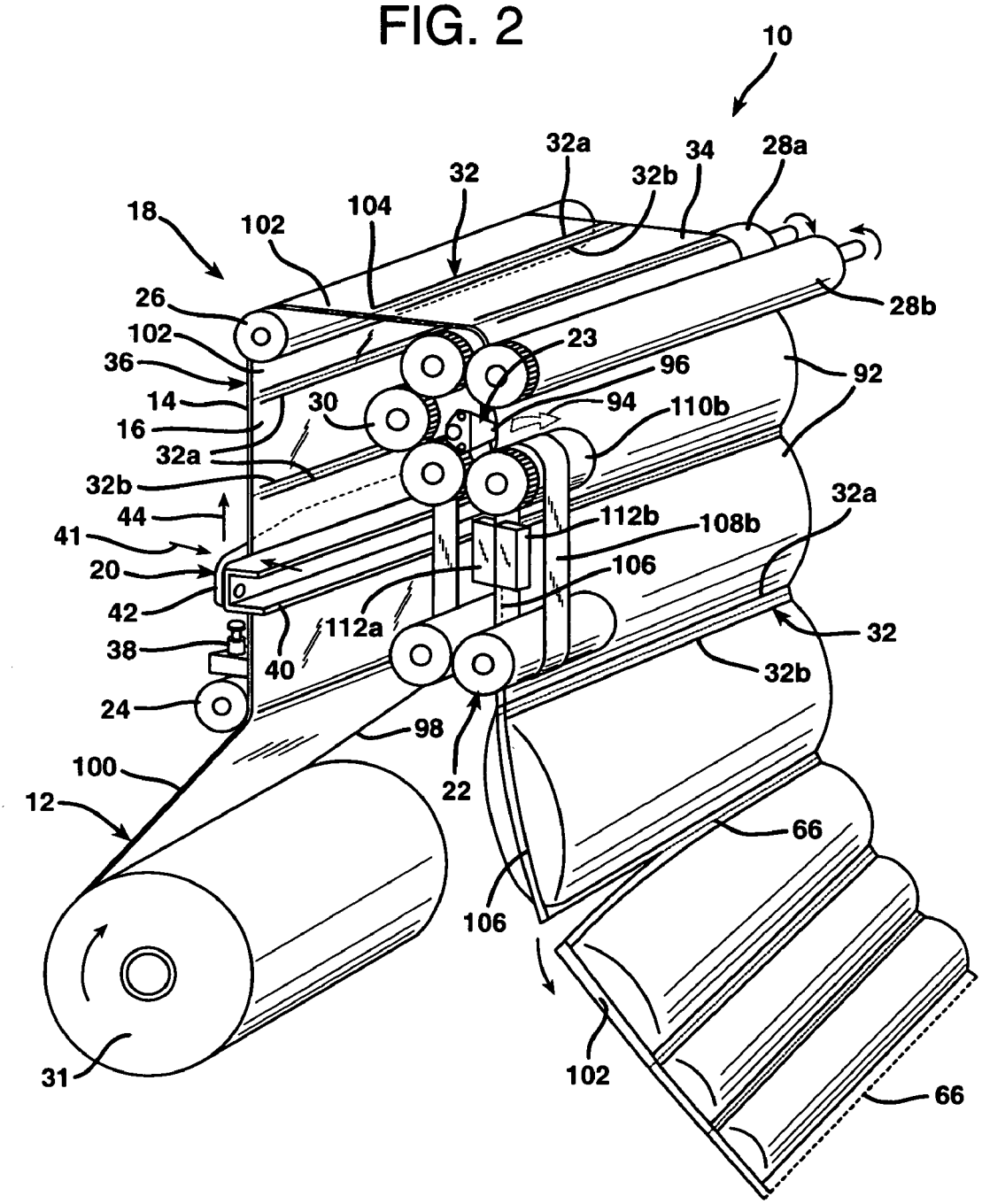
FIGS. 2-4 are similar to FIG. 1, except that they illustrate different stages in the cushion-making process.

In FIG. 2, sealing device 20 attaches itself to film web 12 as clamping members 40, 42 converge, as indicated by the arrows 41, to engage opposing surfaces of the film web. At the same time, film web 12 remains in continuous motion along its travel path due to the conveyance thereof by conveying mechanism 18. Accordingly, by virtue of its attachment to the moving film web, sealing device 20 is lifted off of bottom stops 38 and moves in the direction of arrow 44, which may be in a generally upward direction as shown in FIG. 2.

Figure 3:
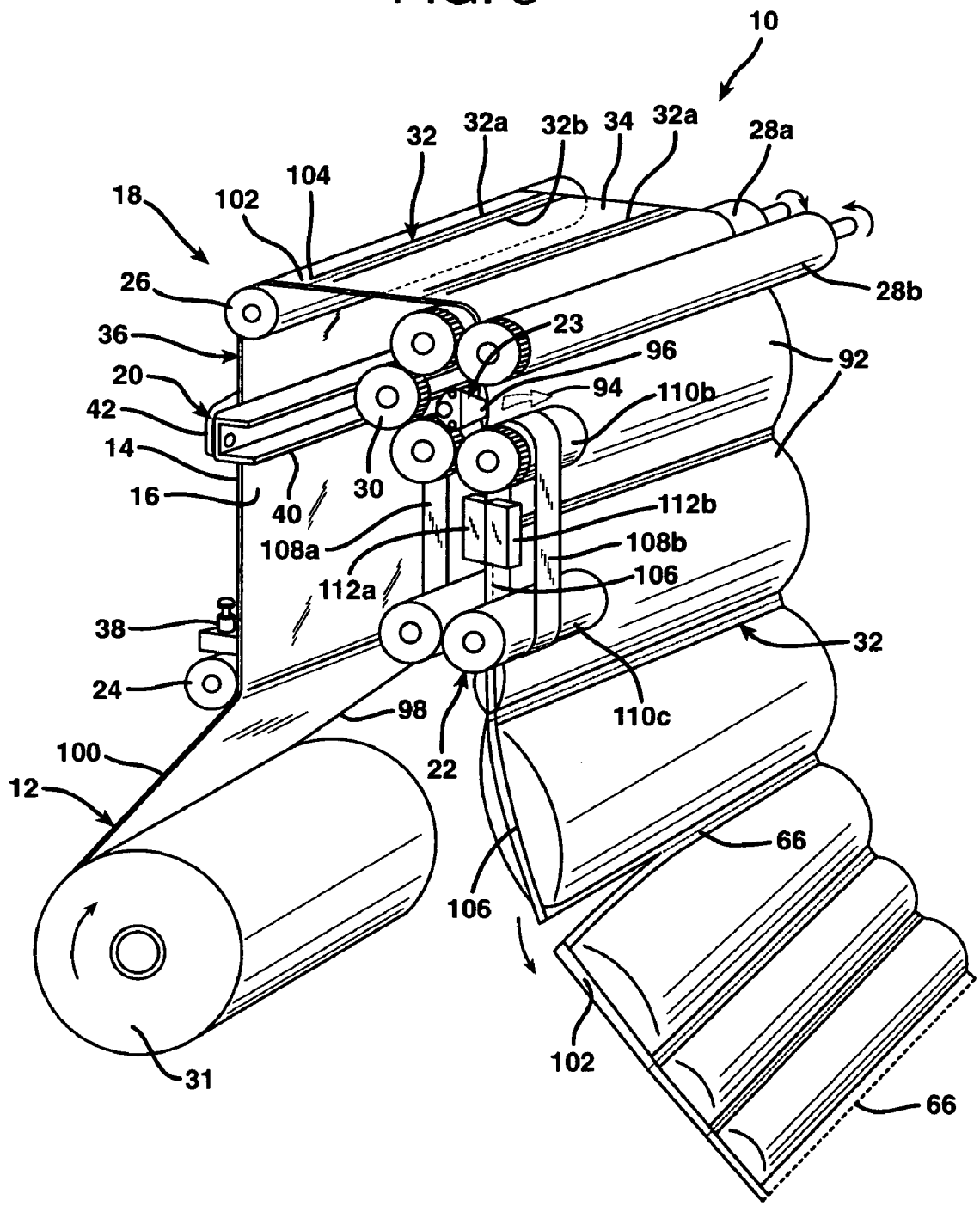

In FIG. 3, the sealing device 20 is at the end-point of its cycle, i.e., the position in the cycle wherein it is farthest removed from its starting point. During its movement from the starting point to the end-point, the sealing device creates one of the seals 32. The particular seal 32 created in this cycle is shown in FIG. 4, and is designated 32' for ease of reference.

Figure 4:
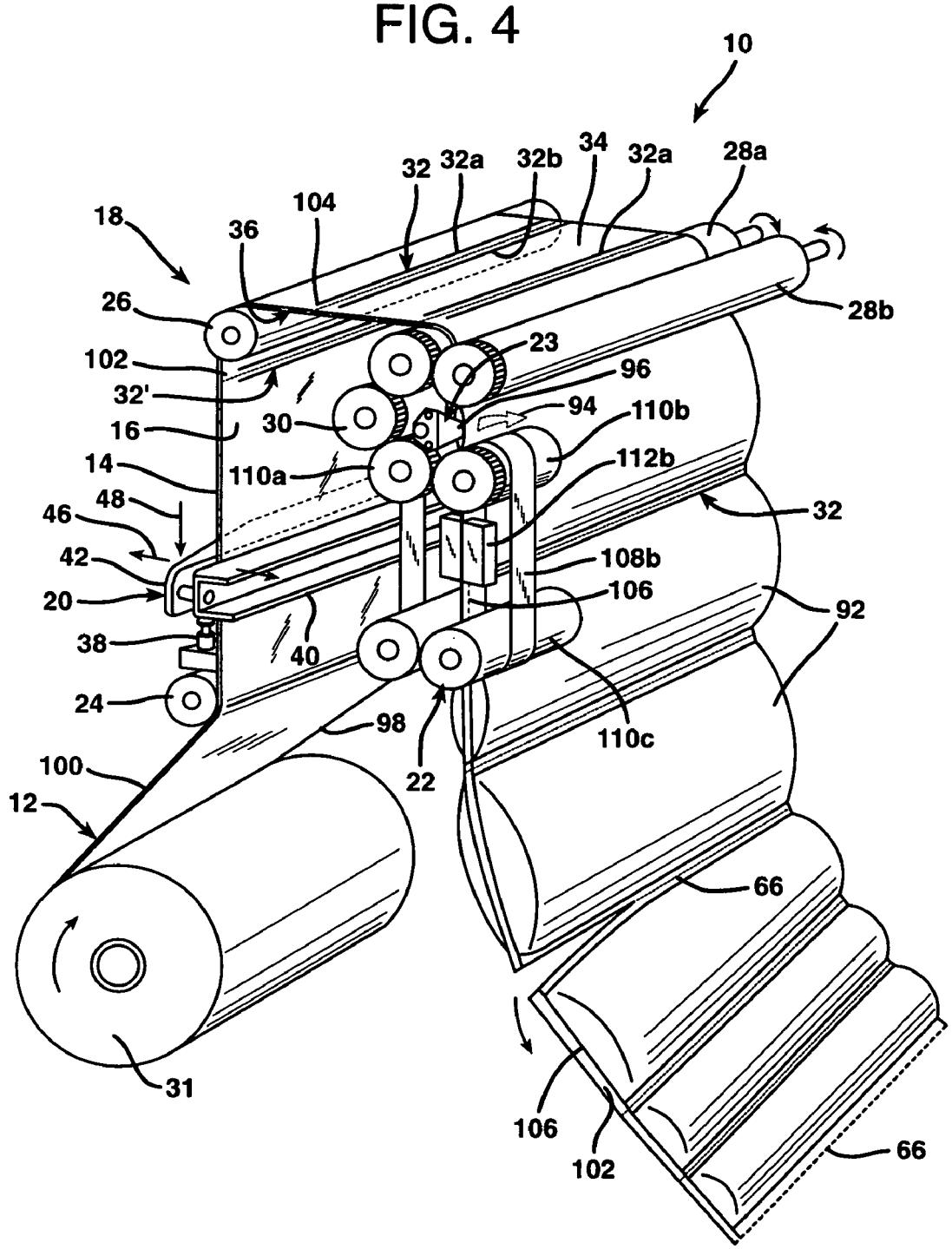

In FIG. 4, seal 32' has been formed and the sealing device 20 has moved with film web 12 along the travel path for a predetermined amount of distance, corresponding to a predetermined cushion-length. Clamping members 40, 42 thus diverge, as indicated by the arrows 46, to release sealing device 20 from the film web. The sealing device 20 then moves in the direction of arrow 48 to return to the starting point in the cycle, as also shown in FIG. 1, wherein device 20 assumes a resting position atop bottom stops 38. In this position, sealing device 20 is ready to again engage the film web 12 in order to produce another seal 32 therein. Such engagement may occur at a predetermined time, based on a desired length between seal 32' and the next seal 32 to be formed, which will determine the length of the resultant cushion formed between seal 32' and the next seal 32 to be formed.

As noted above, and shown in more detail in FIGS. 5-7, the first sealing device includes a pair of clamping members 40, 42, between which passes film web 12. Each clamping member preferably includes a material that facilitates the engagement of each member with a thermoplastic film, e.g., via frictional engagement, such as elastomeric strips 50 as shown. Elastomeric strips 50 may be formed from any suitable material that is capable of gripping a thermoplastic film, such as, e.g., elastomers such as rubbers or silicone, materials providing a high coefficient of friction, such as knurled metal, or materials shaped to provide a tortuous path to better grip the film. The strips may have any desired shape, such as a circular cross-section as shown, and may extend over any desired portion of the contact face 52 and/or 53 of each respective clamping member 40 and/or 42, e.g., over substantially the entire width of each clamping member as shown.

Any suitable mechanism may be employed for causing clamping members 40, 42 to converge toward and diverge away from one another, such as a pair of actuators 54 as shown. Actuators 54 may be affixed to clamping member 40 as shown, or to member 42, or to both (e.g., four separate actuators), and may be actuated pneumatically, hydraulically, electrically, mechanically, magnetically, electro-magnetically, etc., as desired. As shown, actuators 54 are pneumatic, piston-type actuators, which include piston rods 56. The piston rods 56 are part of, and extend from, actuators 54, and are movable by the actuators in the direction of arrow 58 in FIG. 5. The distal end of each of the piston rods 56 is attached to clamping member 42. Actuators 54 thus cause clamping member 42 to move in the direction of arrow 58, thereby causing the clamping members 40, 42 to converge towards and diverge away from one another as desired, i.e., in a manner that may be controlled.

Figure 8:
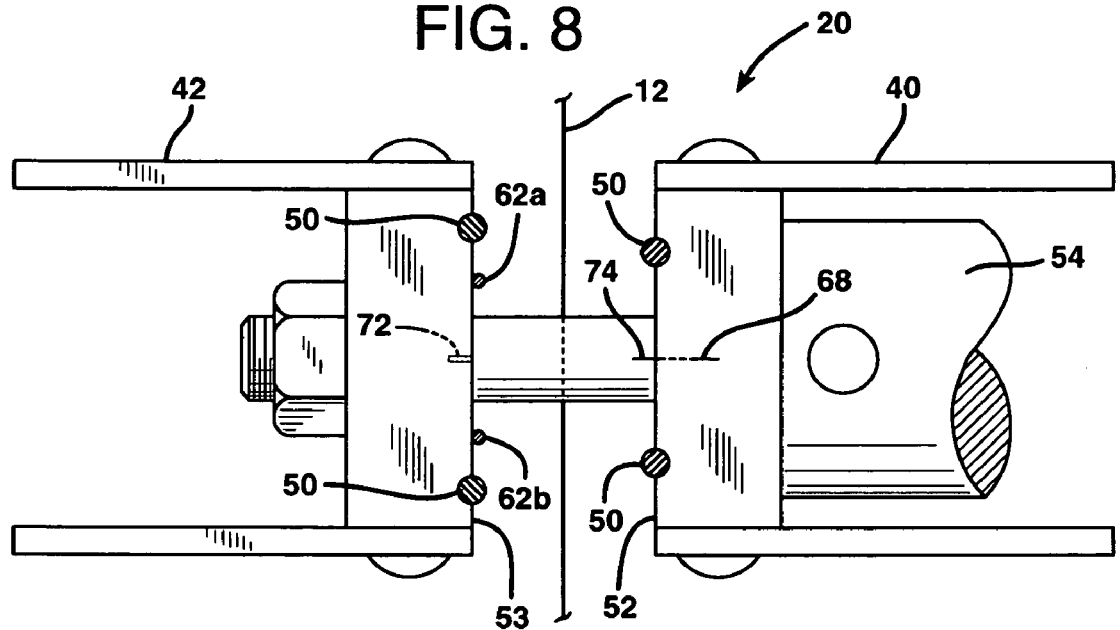
FIG. 8 is a side elevational view of the movable sealing device shown in FIG. 5 with a film web positioned between the two halves of the device.
Figure 9:
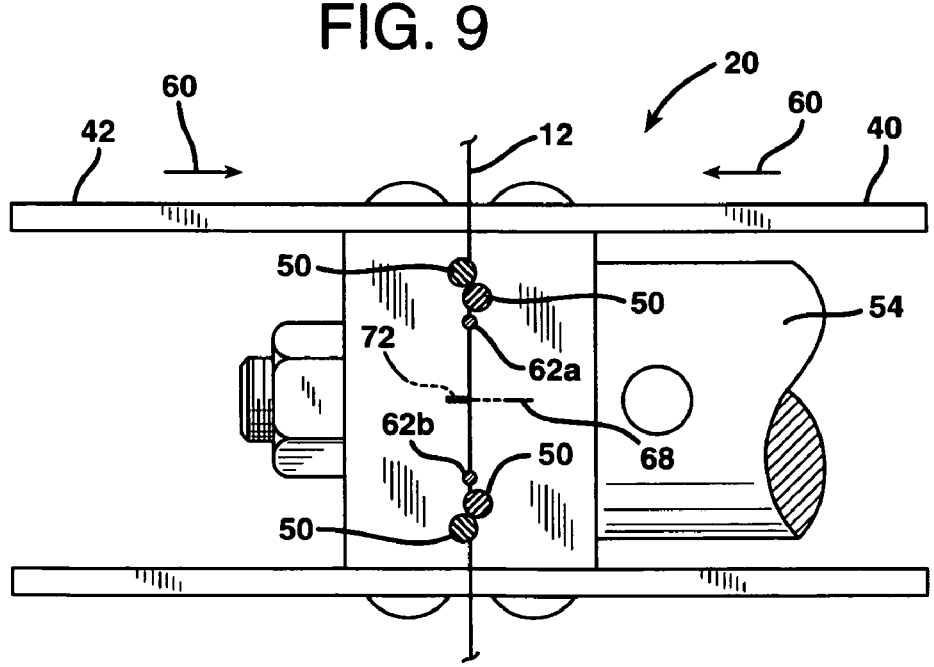
FIG. 9 is similar to FIG. 8, but shows the two halves of the sealing device clamped together with the film web therebetween.

Accordingly, as shown perhaps most clearly in FIGS. 8-9, clamping members 40, 42 are capable of engaging opposing surfaces of film web 12 and exerting a compressive force to squeeze the film web between the clamping members, thereby attaching the first sealing device 20 to the film web.

FIG. 8 shows sealing device 20 in the 'open position,' whereby the film web passes between clamping members 40, 42 while the sealing device remains un-engaged with the film web and, therefore, is stationary on bottom stops 38.

In FIG. 9, clamping members 40, 42 assume the 'closed position' by converging, i.e., moving together in the direction of arrows 60. In so doing, the clamping members 40, 42 squeeze film web 12 therebetween such that the sealing device 20 attaches itself to the film web. Such attachment to the film web may be facilitated by elastomeric strips 50 on clamping members 40, 42, which may be vertically off-set as shown.

Figure 5:
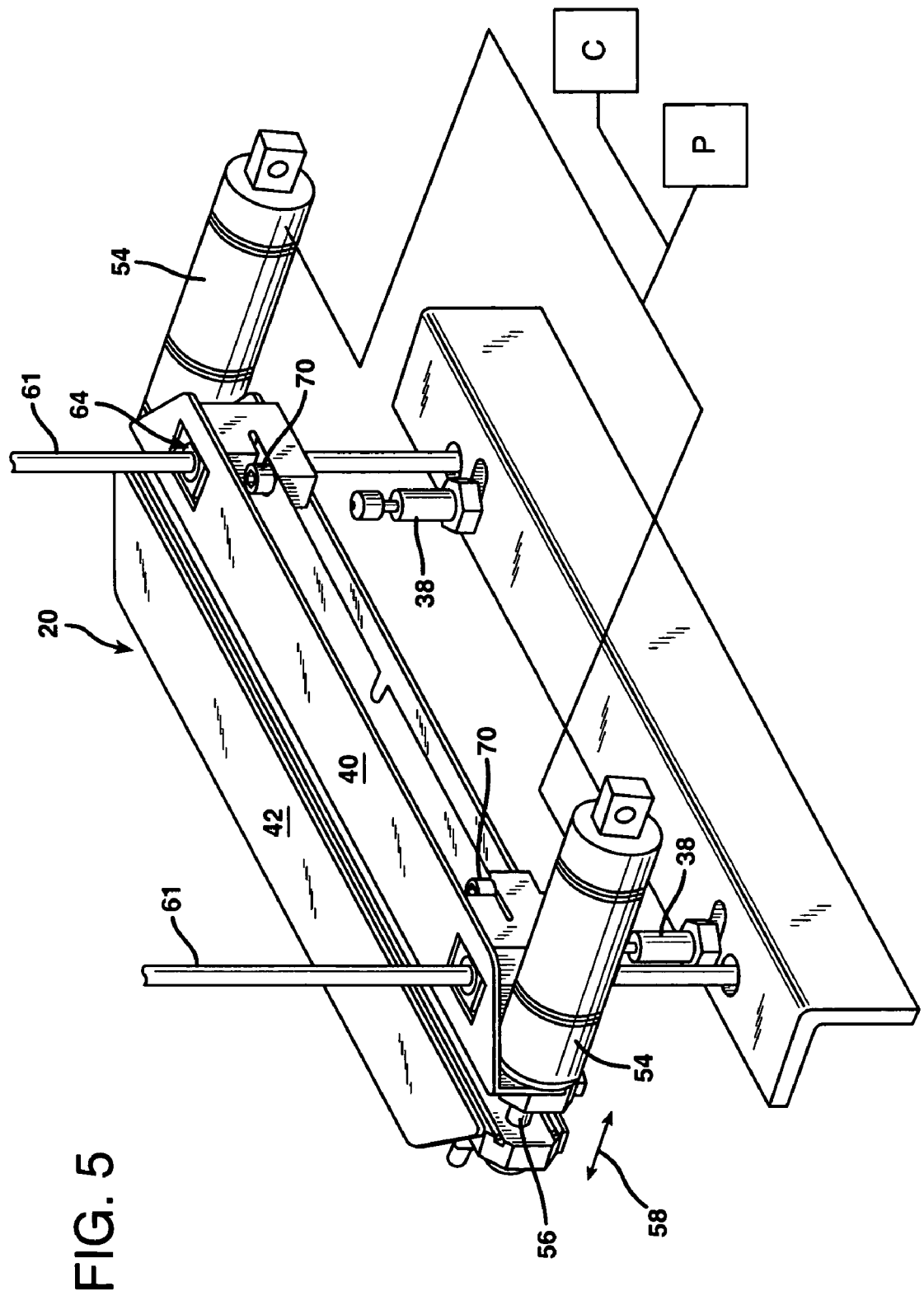
FIG. 5 is a perspective view of the movable sealing device shown in FIGS. 1-4.
Figure 7:
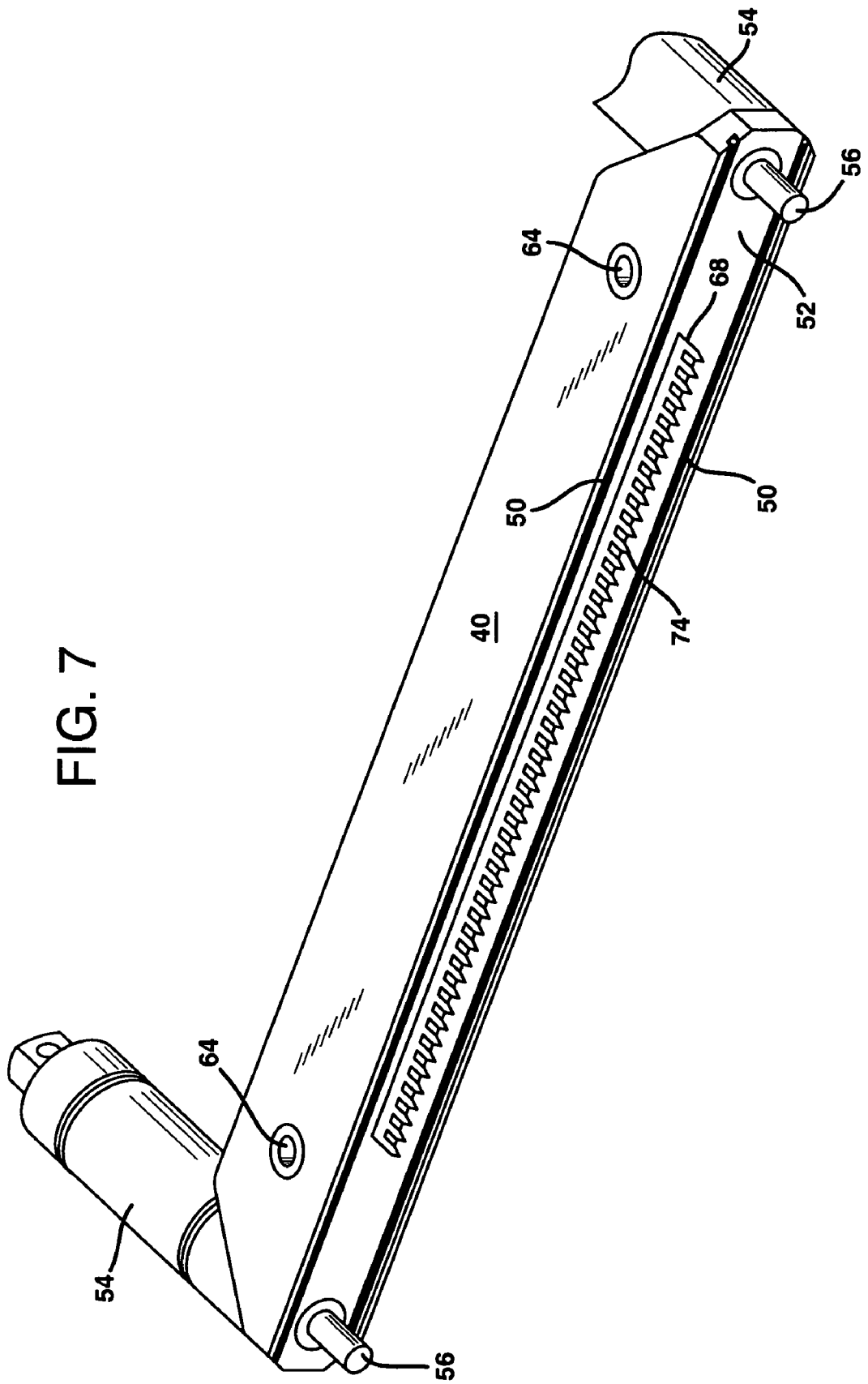
FIG. 7 is a perspective view of the other half of the movable sealing device shown in FIG. 5.

If desired, apparatus 10 may include one or more guide rods 61, as shown in FIG. 5, to aid in controlling the movement of sealing device 20, particularly its return to the starting point of the cycle, after disengaging from film web 12, as shown in FIG. 4. The guide rods 61 may extend through either clamping member, such as through openings 64 in clamping member 40, as illustrated in FIGS. 5 and 7.

As noted above, sealing device 20 produces seals 32. Such seals may be any type of seal that bonds two film plies together, such as a heat seal, adhesive seal, cohesive seal, etc., with heat seals being preferred. A heat seal, or heat weld, may be formed when the film plies 14, 16 are brought into contact with one another and sufficient heat is applied to one or both films in one or more predetermined segments such that at least a portion of each heated film segment becomes molten and intermixes with the other heated segment. Upon cooling, the heated segments of the two film plies become bound together.

Figure 6:
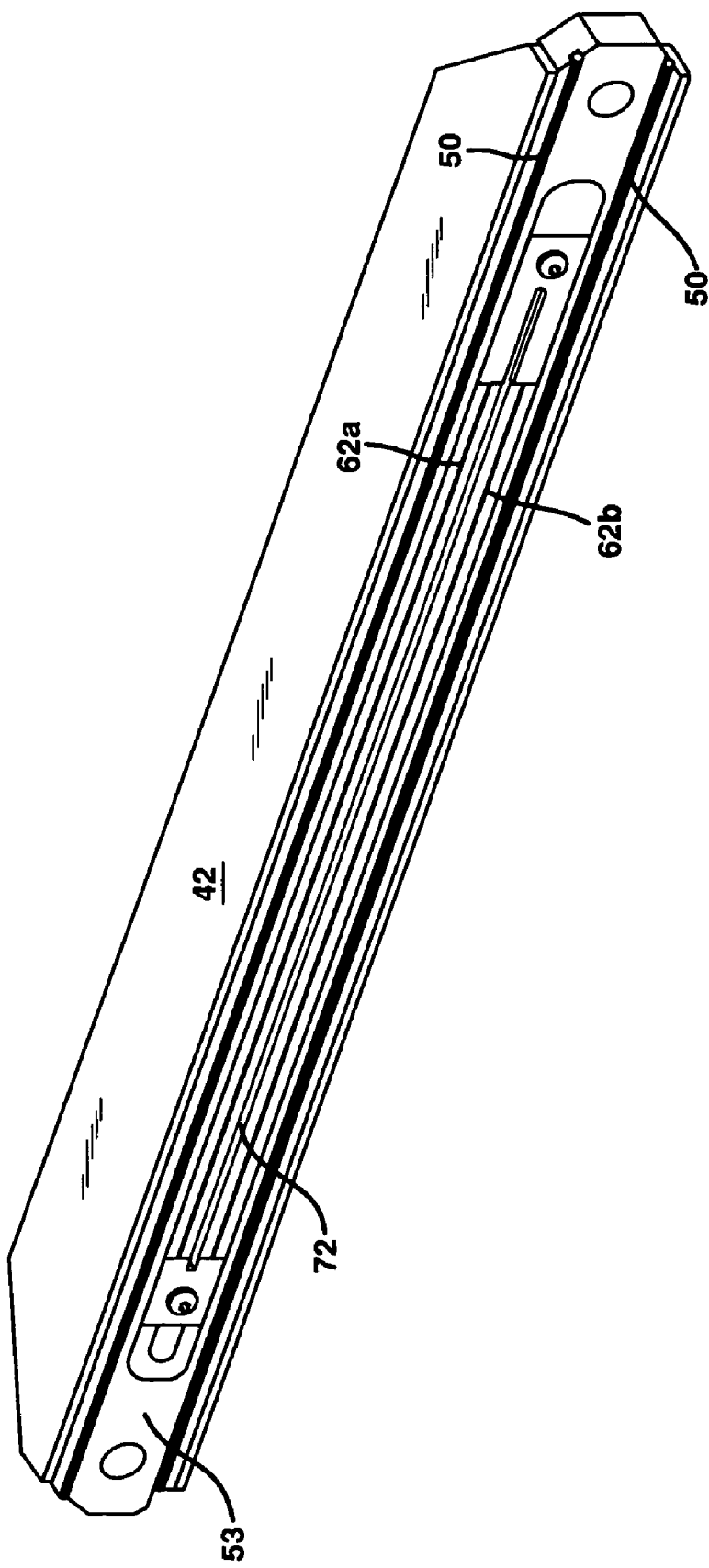
FIG. 6 is a perspective view of one half of the movable sealing device shown in FIG. 5.

Accordingly, one or both of clamping members 40, 42 may contain one or more sealing elements. For example, clamping member 42 may contain a pair of sealing elements 62a and 62b, which are disposed on contact face 53 of the clamping member 42, as shown in FIGS. 6 and 8-9. Such sealing elements 62a, b will produce corresponding first and second transverse seals 32a, b (see FIG. 1). Sealing elements 62a, b may be resistive elements, which produce heat when electricity is supplied thereto (source not shown), and can have any desired shape or configuration. As shown, elements 62a, b are in the form of substantially parallel wires, which produce a pair of substantially parallel heat seals 32a, b in film web 12 when brought into contact therewith. This may be accomplished, as shown in FIG. 9, while the first sealing device 20 is in the 'closed position,' which presses the sealing elements 62a, b into contact with film web 12. Thus, sealing device 20 may produce the seals 32a, b simultaneously while the device is attached to film web 12 as the web is conveyed along the travel path.

Figure 27:
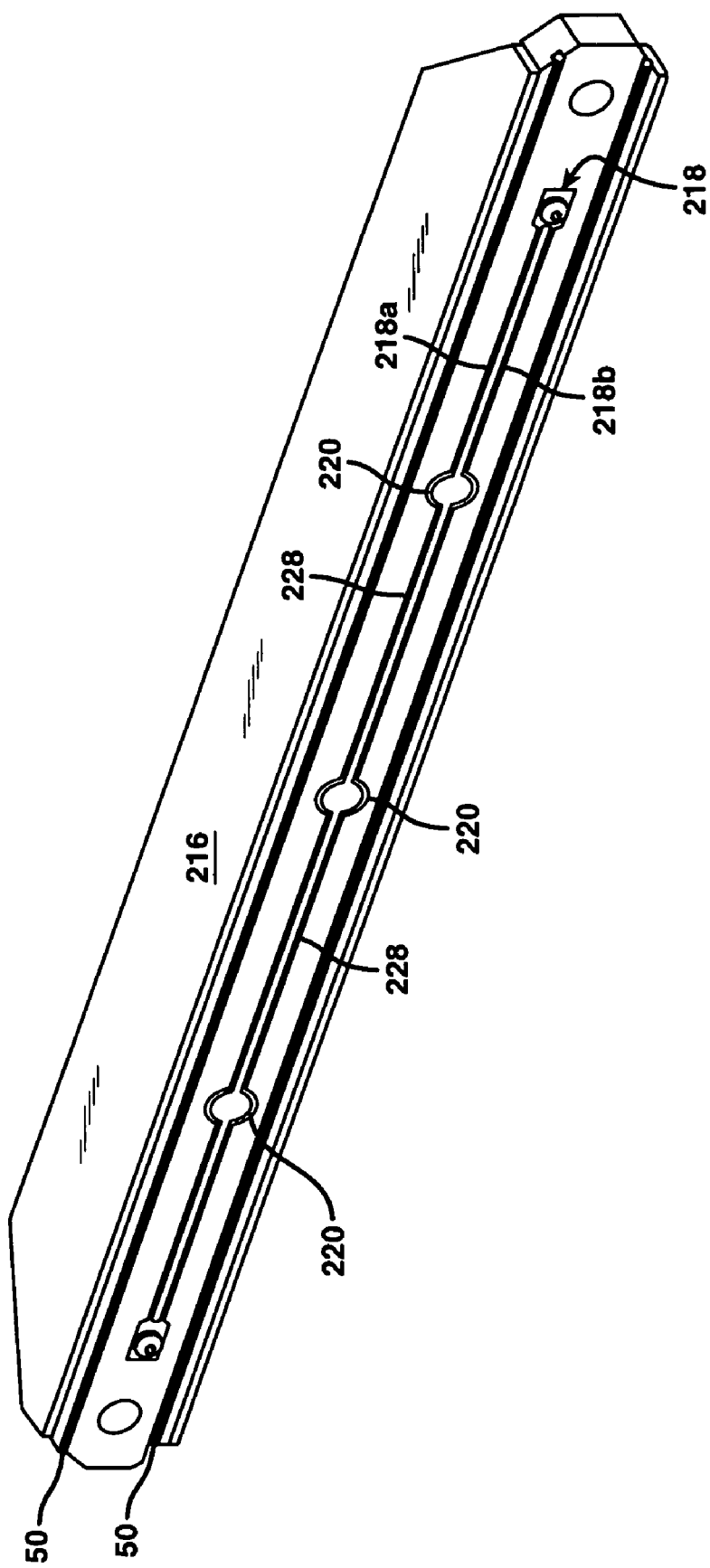
FIG. 27 is a perspective view of an alternative to the sealing device shown in FIG. 6.

In addition to the substantially linear seals 32 that are depicted in the drawings, other shapes and patterns, may also be formed, such as substantially non-linear seals, seals with a combination of linear and non-linear segments, etc. Thus, for example, an alternative to first sealing device 20 may include a clamping member 216 as shown in FIG. 27, which may be used to produce a seal pattern as shown in FIG. 28. Clamping member 216 includes a substantially linear sealing element 218 having one or more non-linear regions 220. The resultant containers have at least one change in longitudinal dimension along their transverse width. This alternative embodiment is described in further detail below.

If necessary or desired, a heat transfer medium may be placed between the sealing elements 62a, b and the film web 12, such as a coating of PTFE, e.g., TEFLON tape, polyester, or other material capable of withstanding the heat from the sealing elements and transferring the same to the film web in a sufficient amount to create seals 32.

Upon completion of the individual containers 34, their separation from one another and/or from film web 12 may be facilitated by including a line of weakness 66 between adjacent containers (see FIGS. 1-4). Accordingly, apparatus 10 may further include a device for forming one or more lines of weakness between each container or between groups of two or more containers. Such a device, for example, may be incorporated into or onto, e.g., affixed to, first sealing device 20 in order to form a line of weakness 66 between the first and second transverse seals 32a, b of adjacent containers 34.

A suitable device for creating line of weakness 66 is a perforation blade 68, which is capable of producing a perforation-type line of weakness (see FIGS. 7-9). Perforation blade 68 may be affixed to either or both of the clamping members 40, 42. As illustrated, perforation blade 68 is affixed to clamping member 40, e.g., via fasteners 70 (see FIG. 5). Blade 68 may be serrated as shown. A corresponding slot 72 may be provided in clamping member 42. Preferably, slot 72 is suitably dimensioned and aligned with blade 68 such that, when clamping members 40, 42 converge into the closed position as shown in FIG. 9, the leading edge 74 of perforation blade 68 enters into and is received by slot 72. In this manner, the pointed serrations on the leading edge 74 of perforation blade can penetrate through the film web 12 to create a perforation-type line of weakness. As shown, slot 72 and blade 68 may be positioned between sealing elements 62*a, b* such that, upon convergence of clamping members 40, 42, the resultant line of weakness 66 is positioned between the resultant first and second transverse seals 32*a, b*.

Advantageously, the creation of a line of weakness 66 in the foregoing manner occurs substantially simultaneously with the creation of seals 32, i.e., while sealing device 20 is attached to film web 12. However, line of weakness 66 could also be formed in a separate step, e.g., with a perforation device that is separately positioned and independently operated from first sealing device 20 if desired.

FIGS. 1-4 show each container 34 separated by a line of weakness 66. However, if desired, fewer numbers of weakness lines 66 may be employed such that not every container is separated from an adjacent container by a line of weakness. For example, perforation blade 68 could be independently operated and/or separately positioned to create lines of weakness between any desired number of containers, e.g., between every other container, every third container, every tenth container, etc. This may be desirable when making complex cushions containing groups of two or more inflated containers, e.g., having two or more sizes.

With continuing reference to FIGS. 1-4, it may be seen that first sealing device 20 attaches itself to film web 12 at a starting position (FIG. 1), produces one or more seals 32 while attached to the film web as the web is conveyed along the travel path (FIGS. 2-3), then disengages from the film web and returns to the starting position (FIG. 4). As illustrated, sealing device 20 is conveyed along the film's travel path by being attached to, and therefore transported by, film web 12, with no separate mechanism to cause the sealing device 20 to move in this manner. That is, by virtue of the attachment of sealing device 20 to film web 12, conveying mechanism 18 moves both the film web and sealing device 20 along the travel path. This is advantageous from the standpoint of cost and simplicity. As also illustrated, sealing device 20 returns to the starting position by force of gravity, i.e., with no separate mechanism to cause the sealing device 20 to return to its starting position. This is also advantageous for reasons of cost and simplicity.

Figure 10:
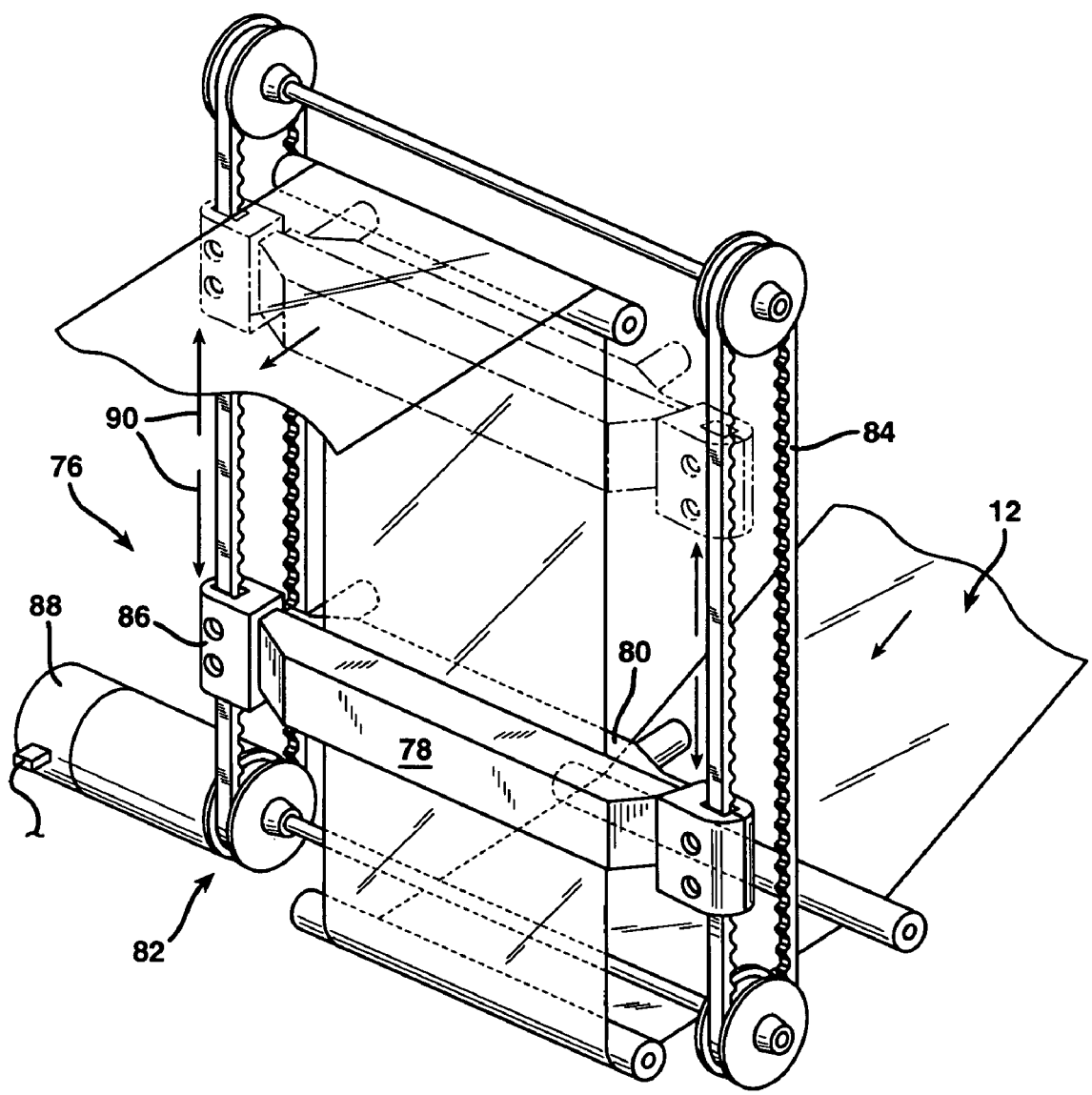
FIG. 10 illustrates an alternative embodiment of the invention, wherein the movable sealing device is conveyed independently of, but preferably in synchronization with, the mechanism that conveys the film web.

However, in some applications, it may be desirable to provide a mechanism that separately conveys the first sealing device. Such a mechanism is illustrated in FIG. 10, wherein an alternate first sealing device 76 is illustrated, which includes clamping members 78, 80 and a drive mechanism 82. Clamping members 78, 80 operate in a similar manner as clamping members 40, 42 as described above, except that they are attached to drive chain 84, which is part of drive mechanism 82, via couplings 86. Drive mechanism 82 also includes a motor 88, which rotatably drives chain 84 in the direction of the arrows 90, and thereby also moves clamping members 78, 80 in the direction of arrows 90, e.g., upwards and downwards as shown. While clamping members 78, 80 may be capable of converging upon film web 12, they do not need to attach themselves to the web. That is, instead of being pulled along solely by the film web, clamping members 78, 80 are separately conveyed by drive mechanism 82, preferably at a speed that is substantially the same as the speed at which the film web is conveyed. In this manner, clamping members 78, 80 still travel with the film web while making transverse seals. However, attachment to the film web is not required. Instead, the clamping members need only come into sufficiently close proximity to the film web to effect a seal therein. When the clamping members 78, 80 reach the upper reach of their travel (shown in phantom in FIG. 10), they diverge to release film web 12. At that point, a transverse seal having been made (not shown in FIG. 10), the clamping members 78, 80 return to the starting position. In one embodiment, couplings 86 are releasable from drive chain 84, and return to the starting position by force of gravity upon their release from the drive chain. The couplings then re-engage the drive chain in preparation to make the next seal. Alternatively, motor 88 can be caused to reverse its rotation to drive the clamping members back to the starting position, in which case couplings 86 remain in attachment with drive chain 84.

If desired, motor 88 can drive both the conveyance mechanism for the film web and the conveyance mechanism for the sealing device 76, i.e., as a shared power source, via suitable mechanical linkage (e.g., gears, belts, and/or chains) to both conveyance mechanisms from the motor 88.

Many configurations for film web 12 are possible. As illustrated in FIGS. 1-4, film web 12 may have a closed longitudinal edge 98 and an opposing open longitudinal edge 100. Open longitudinal edge 100 provides the openings 36 into the containers 34. Closed longitudinal edge 98 may be formed by 'center-folding' film web 12 at edge 98 such that each of film plies 14, 16 have substantially the same dimension. Suitable center-folding devices and methods are well-known in the art. Center-folding may be performed at any desired time, e.g., shortly after the film is produced and/or just before being wound onto supply roll 31. Alternatively, a center-folding device may be added to or used with apparatus 10 at some point downstream of supply roll 31. Such an addition would allow film web 12 to be provided on supply roll 31 as a flat sheet, which would then be converted to a center-folded film by apparatus 10 as a part of the cushion-making process.

As a further alternative, separate film plies 14, 16 may be juxtaposed and sealed together along adjacent longitudinal side edges, e.g., via heat-sealing, to form closed longitudinal edge 98. As a further alternative, film web 12 may be a flattened tube, i.e., with two opposing folded/closed longitudinal edges, wherein one of the longitudinal edges is slit at some point 'upstream' of inflation assembly 23 to form open edge 100.

As used herein with reference to film web 12, the term "longitudinal" refers generally to the direction of conveyance of film web 12 through apparatus 10 as indicated in the drawings; "longitudinal" also corresponds to the direction of the length dimension (longest dimension) of film web 12 as represented, e.g., by the longitudinally-extending edges 98 and 100. "Transverse" refers generally to the width dimension of the film web, which is at an angle, e.g., substantially perpendicular, to the longitudinal dimension of the film web.

Film web 12 may, in general, comprise any flexible material that can be manipulated by apparatus 10 to enclose a gas as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

As noted above, the seals 32 produced by first sealing device 20 preferably include first and second substantially transverse, spaced-apart seals 32a and 32b that define, along with closed longitudinal edge 98 of film web 12, each of the containers 34. As shown, the first and second transverse seals 32a, b may extend from the closed longitudinal edge 98 and terminate a predetermined distance from the open longitudinal edge 100 such that each of the juxtaposed film plies 12, 14 have flanges 102 at the open longitudinal edge that are not bonded together. As shown, such flanges 102 extend along the open longitudinal edge 100. Thus, flanges 102 are longitudinally extending edge sections of film plies 12, 14 that extend beyond the ends 104 of seals 32 and, therefore, are not bonded together, i.e., by seals 32 or any other means. The purpose for such flanges is explained immediately below. However, it is to be understood that the present invention is not limited to film webs having such un-bonded flanges, as many other configurations are possible, e.g., edge 100 could be a closed edge, thereby forming an inflation channel that extends longitudinally between ends 104 and such closed edge.

As explained hereinabove, apparatus 10 further includes an inflation assembly 23 for inflating the containers 34, and a second sealing device 22 for sealing closed the opening of each inflated container 92. The inflation assembly 23 inflates the containers 34 by directing a stream of gas, indicated by arrow 94, into the opening 36 of each container. Inflation assembly 23 includes a nozzle 96 from which the stream of gas 94 exits the inflation assembly (see FIGS. 12-13). As shown in FIGS. 1-4, nozzle 96 may protrude into the open longitudinal edge 100 to facilitate the inflation of containers 34. This may be accomplished, e.g., by sequentially moving the nozzle into and out of the openings 36 of each container 34 to inflate the containers as they move past the nozzle, which may require intermittent movement of film web 12.

Alternatively, when film web 12 contains flanges 102 as described above, at least a portion of the nozzle 96 may be positionable between the flanges 102 so that, as conveying mechanism 18 conveys the web along the travel path, the nozzle moves longitudinally between the flanges. In this manner, nozzle 96 may remain in a fixed position while film web 12 moves continuously past the nozzle. Inflation assembly 23 also includes a conduit (not shown) or other means to supply gas, e.g., air, nitrogen, carbon dioxide, etc., to inflation nozzle 96.

As shown most clearly in FIGS. 1-4, second sealing device 22 forms a third, substantially longitudinal seal 106 that intersects the first and second transverse seals 32a, b, thereby sealing closed the opening 36 of each inflated container 92. In this manner, gas 94 is sealed inside the containers. This essentially completes the process of making inflated containers.

Many types of sealing devices are suitable for making longitudinal seal 106. For example, second sealing device 22 may be embodied by a type of device known as a 'band sealer,' which includes counter-rotating bands 108a, b; rollers 110a-d to cause the counter-rotation of the bands 108a, b; and one or more heating blocks 112a, b (see FIGS. 1-4 and 11-13). One or both of blocks 112a, b may be heated by any suitable means, such as electrical resistance heating, fluid heating, etc. When brought into contact with respective bands 108a, b as shown in FIGS. 1-4, heat is transferred from the blocks to the bands to effect longitudinal seal 106. Bands 108a, b thus provide a heat-transfer medium between heating blocks 112a, b and film web 12. In addition, bands 108a, b are urged against one another via the positioning of rollers 110a-d to form a compressive zone, between which film plies 14, 16 are compressed to both facilitate the formation of longitudinal seal 106 and to assist in conveying film web 12 through apparatus 10. Thus, the same motor 30 that causes the rotation of nip rollers 28a, b may also cause the rotation of rollers 110a-d, e.g., by being mechanically linked to rollers 28a and 110a as shown, which may, in turn, be mechanically linked to respective rollers 28b and 110b-d.

Figure 11:
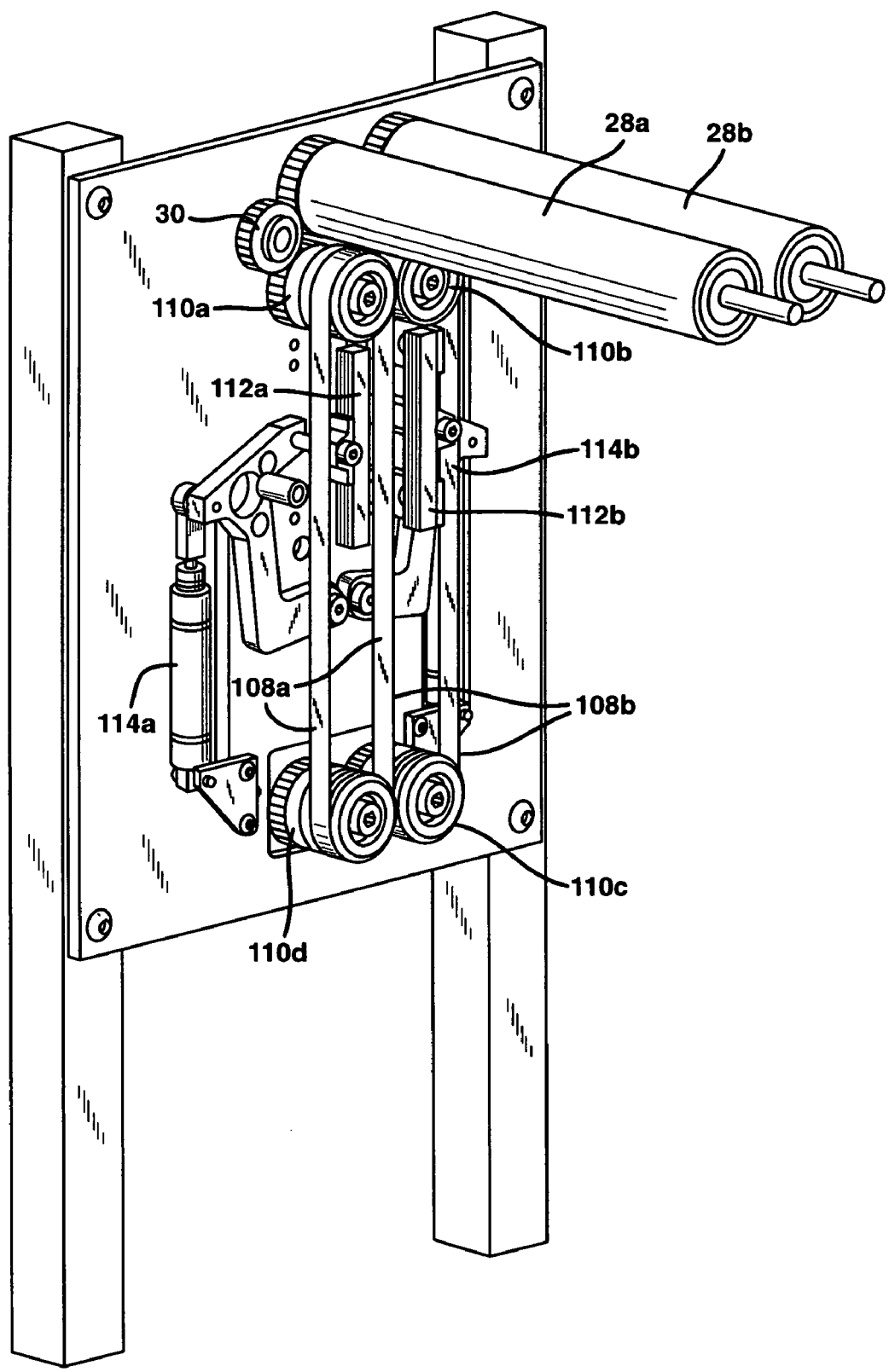
FIG. 11 is a perspective view of the film conveyance mechanism and second/stationary sealing device illustrated in FIG. 1.
Figure 12:
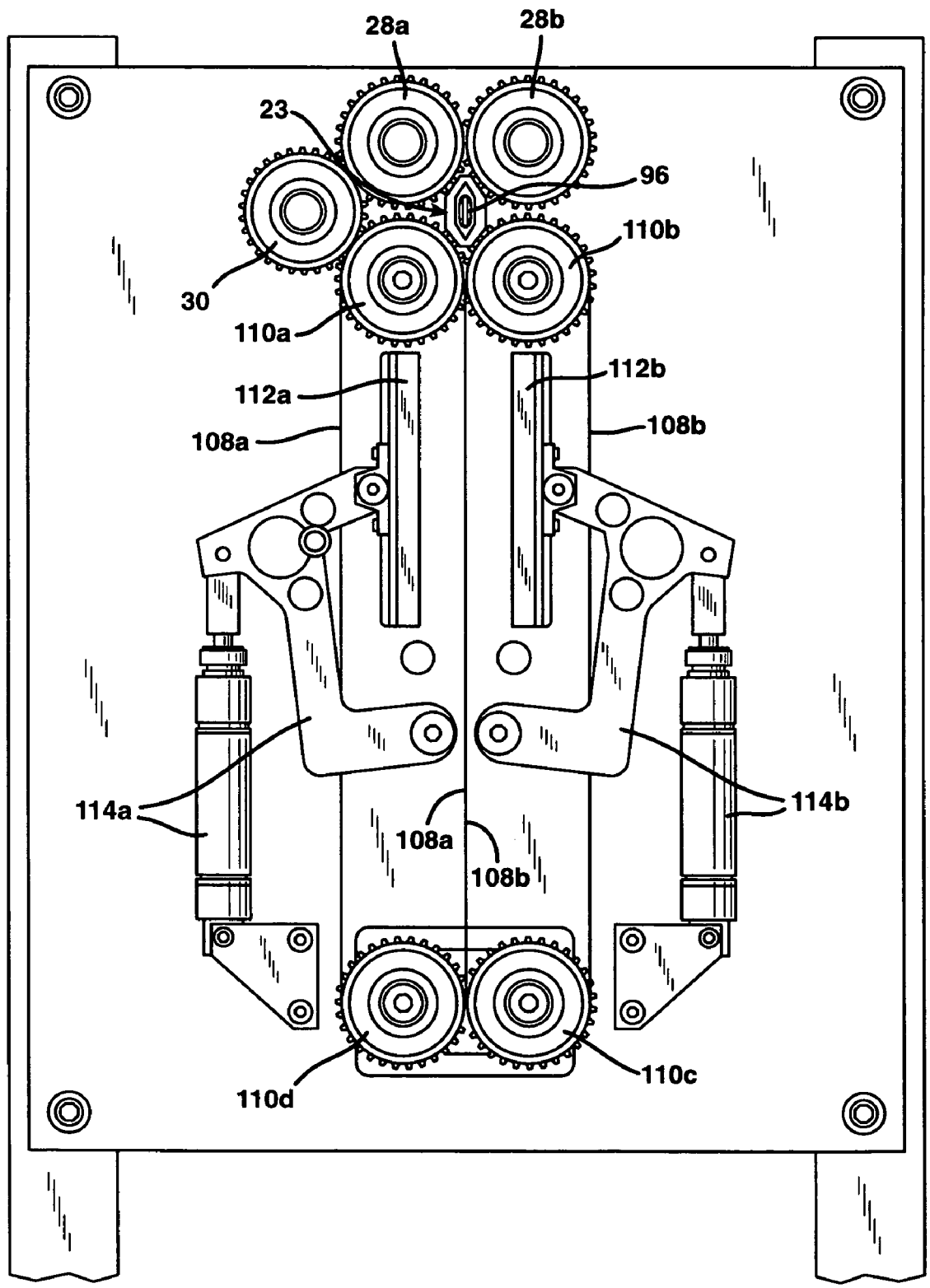
FIG. 12 is a front elevational view of the film conveyance mechanism and second/stationary sealing device illustrated in FIG. 11; in this view, the discharge end of the inflation nozzle, which is shown from the rear in FIG. 1, is also shown.
Figure 13:
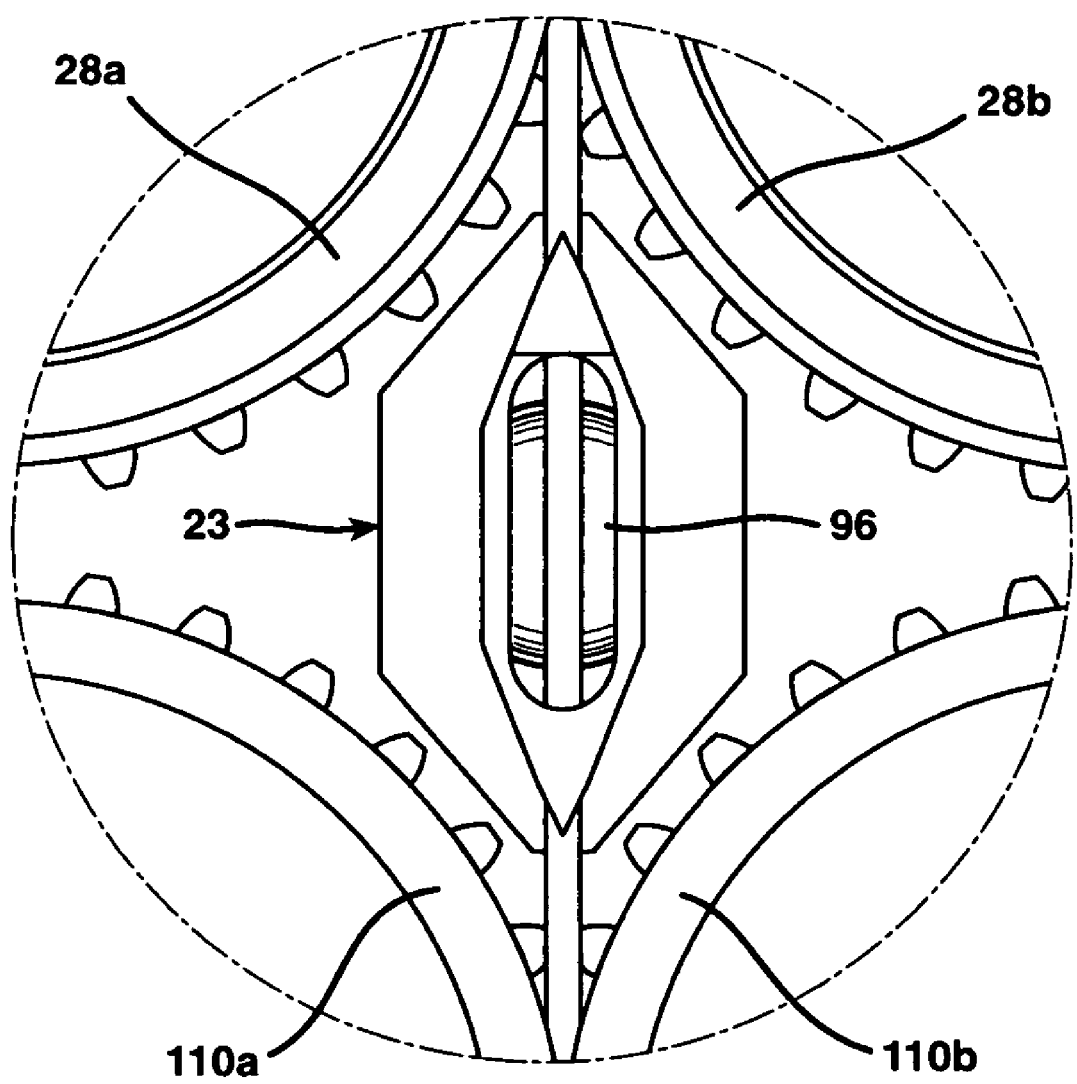
FIG. 13 is a magnified view of the inflation nozzle shown in FIG. 12.

FIGS. 11-12 show heating blocks 112a, b in a 'non-heating position,' in which the blocks are not in contact with respective bands 108a, b. Such position may be advantageously employed when the apparatus 10 is in an idle mode, i.e., temporarily not producing inflated containers such that bands 108 are not rotating. In this fashion, the second sealing device 22 does not burn through film web 12, which could otherwise occur if the heating blocks remained in contact with the non-rotating bands 108 which, in turn, remain in contact with a non-moving section of film web 12. Thus, sealing device 22 may further include a mechanism to move the heating blocks 112 from the non-heating position shown in FIGS. 11-12 to the 'heating position' shown in FIGS. 1-4, such as, e.g., actuators 114a, b and related linkage as shown in FIGS. 11-12. Instead or in addition, an 'idle' or 'non-heating position' may also be achieved by providing a controller to discontinue or reduce the heat generated by blocks 112.

An alternative sealing device which may be used for second sealing device 22 is a type of device known as a "drag sealer," which includes a stationary heating element that is placed in direct contact with a pair of moving film plies to create a continuous longitudinal seal. Such devices are disclosed, e.g., in U.S. Pat. Nos. 6,550,229 and 6,472,638, the disclosures of which are hereby incorporated herein by reference. A further alternative device for producing a continuous longitudinal edge seal, which may be suitably employed for second sealing device 22, utilizes a heating element that is completely wrapped about the outer circumference of a cylinder, as disclosed in U.S. Pat. No. 5,376,219, the disclosure of which is hereby incorporated herein by reference.

An advantageous feature of apparatus 10 in accordance with the present invention is that such apparatus can make inflated containers of substantially the same dimension or, if desired, the apparatus can make inflated containers of varying dimension such that two or more adjacent containers in the film web have different dimensions. For example, inflated container 92' can have a length L1 while adjacent container 92" can have a length L2 (see FIG. 1).

The apparatus can switch between these two modes (i.e., making containers of the same length vs. making containers having different or variable lengths) at will and within the same film web. Thus, the operator does not have to change film webs to produce containers having different dimensions. Such differently-dimensioned containers may or may not have lines of weakness therebetween, depending upon the desired application for the resultant cushion. This ability to create differently-dimensioned containers results from fact that the first sealing device 20 moves with, e.g., by attaching itself to, the film web 12 as it makes seals 32. The sealing device can therefore be controlled such that it attaches to and releases from the film web at predetermined speeds or intervals, which can vary as desired to result in varying container-lengths, i.e., varying dimensions.

In some applications, manual control of first sealing device 20 may be appropriate, e.g., for relatively low-volume cushion production. This may be accomplished by manipulation of, e.g., an 'open/close' switch, or other manually operated control device "C" (represented schematically in FIG. 5) to control the flow of power from power source "P" to actuators 54, which, as explained above, control the engagement ('closed position') and disengagement ('open position') of first sealing device 20. The operator can thus produce any desired container length, which can vary as necessary to optimally suit the end-use application.

For higher-volume applications, i.e., where a relatively large quantity of cushions are produced, automatic control may be preferable. Thus, control device "C" may be an automatic controller, such as a programmable logic controller or "PLC," to control the actuation of the first sealing device 20. If employed, such automatic controller may be made operative to cause the sealing device 20 to form the first and second transverse seals 32a, b with a specified amount of spacing within a given container, thereby producing containers with a specified length dimension. One manner of controlling such spacing between the transverse seals is to use an encoder or other device to keep track of the revolutions of nip rollers 28a and/or 28b and, based on the diameter of the nip roller, convert the number of revolutions into the amount of film web 12 that has been conveyed per revolution, thereby tracking the amount of film web 12 moving through apparatus 10. With this information, the controller causes sealing device 20 to release and engage the film web each time that a desired amount of film has been conveyed since the last actuation of/seal-creation by the sealing device, thereby producing a desired length dimension in the resultant cushion by creating a seal with a desired amount of spacing from the previously-made seal.

For example, the controller could be programmed to cause apparatus 10 to produce a series of inflated containers having the same length dimension, such as container 92' with length dimension L1 (see FIG. 1), then switch to making a series of inflated containers such as 92" having the shorter length dimension L2. Alternatively, the controller could cause apparatus 10 to produce a series of inflated containers having randomly different length dimensions.

Figure 16:
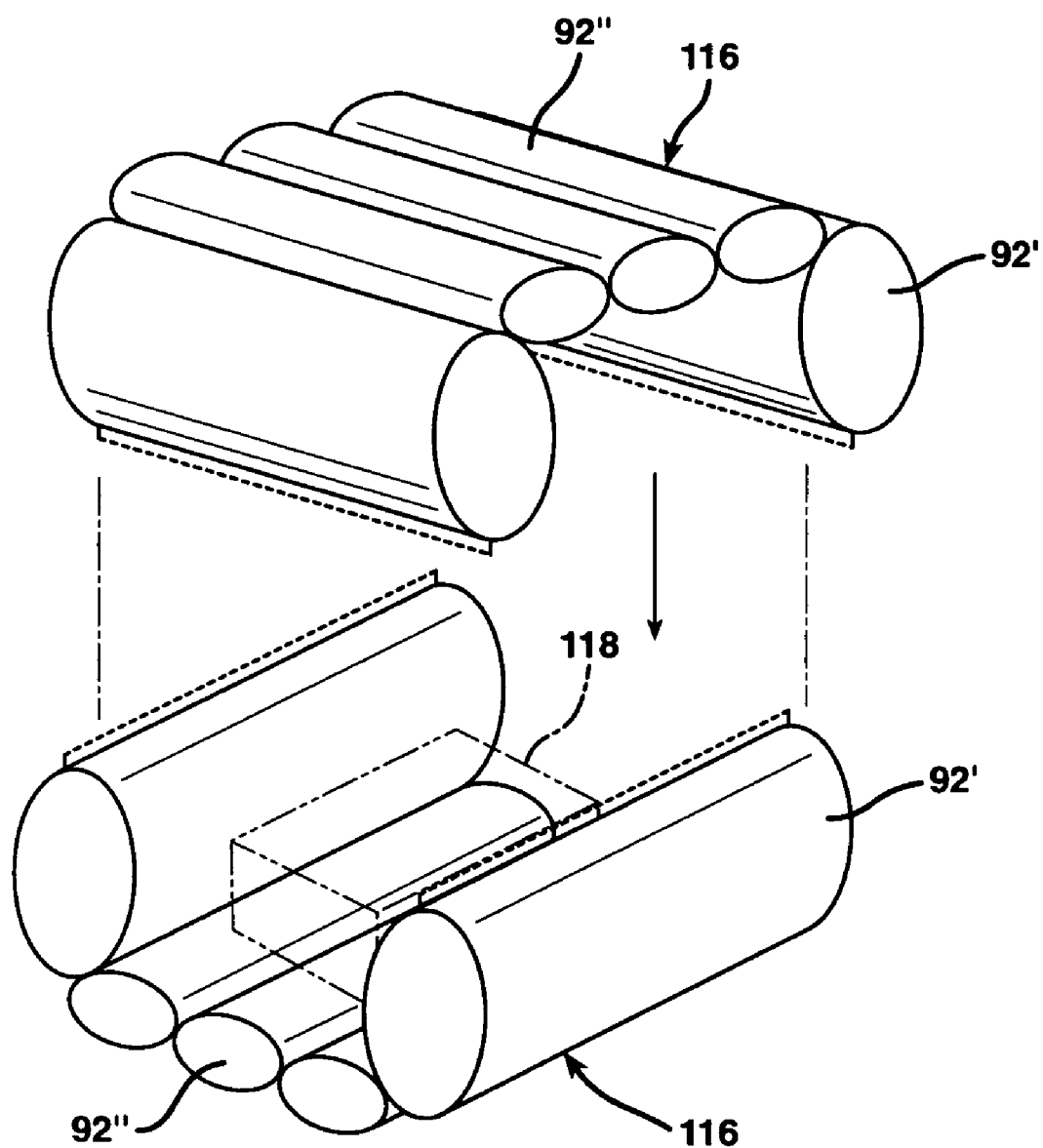
FIG. 16 is a perspective view of a pair of cushions in accordance with the present invention, wherein such cushions are shown in a configuration in which they may be used to protect an article to be packaged, and wherein each cushion comprises inflated containers of varying dimension, with two or more adjacent containers in the cushion having different dimensions.

As a further alternative, a repetitive pattern of different container sizes can be produced. That is, apparatus 10 can be controlled to make a repeating pattern of inflated containers, wherein two or more containers in the pattern are dimensioned differently from one another. Thus, for example, two relatively long containers 92' followed by three relatively short containers 92" can be produced. If the inflated containers in such a pattern are separated only between the larger containers 92', e.g., via lines of weakness 66, a number of composite cushions 116 as shown in FIG. 16 may be made. Such cushions 116 comprise two differently-sized inflated containers, i.e., two relatively long containers 92' with three relatively short containers 92" in between the long containers. Advantageously, cushions 116 may be used in pairs as shown to protect a product 118 for packaging, e.g., by placement inside of a box. Such a packaging scheme as shown in FIG. 16 is merely one illustration of the flexibility in producing multi-dimensional packaging cushions that is made possible because of the ability of apparatus 10 to make inflated containers having different or variable lengths as desired.

Lines of weakness 66 may be formed between each inflated container or, where groups of connected inflated containers are used to form a compound cushion as shown in FIG. 16, such lines of weakness may be formed only between designated container groups, e.g., by making perforation blade 68 separately actuatable from sealing elements 62a, b.

Figure 14:
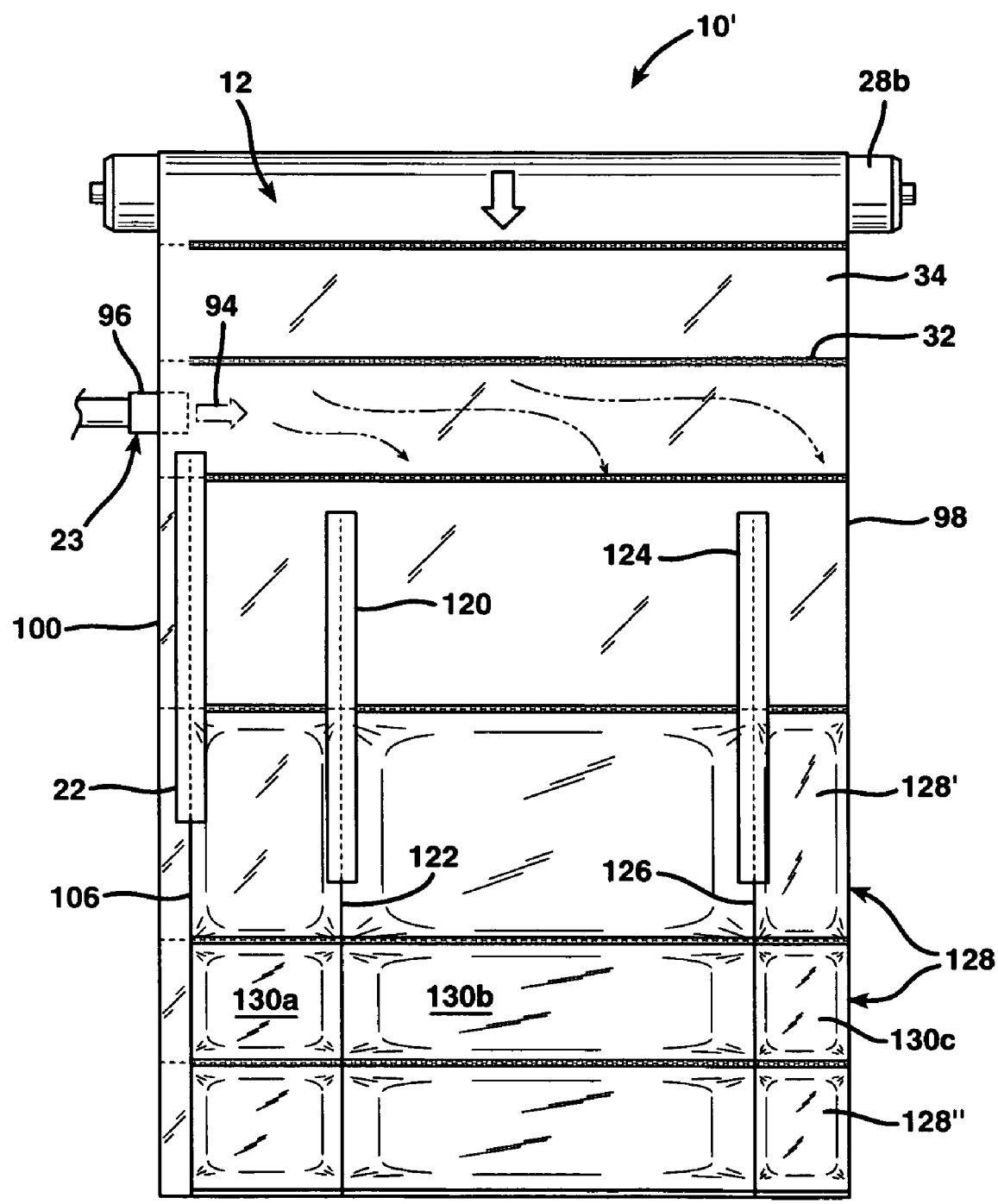
FIG. 14 illustrates an alternative embodiment of the invention, wherein multiple longitudinal sealing devices are employed to create multiple compartments in each cushion.
Figure 15:
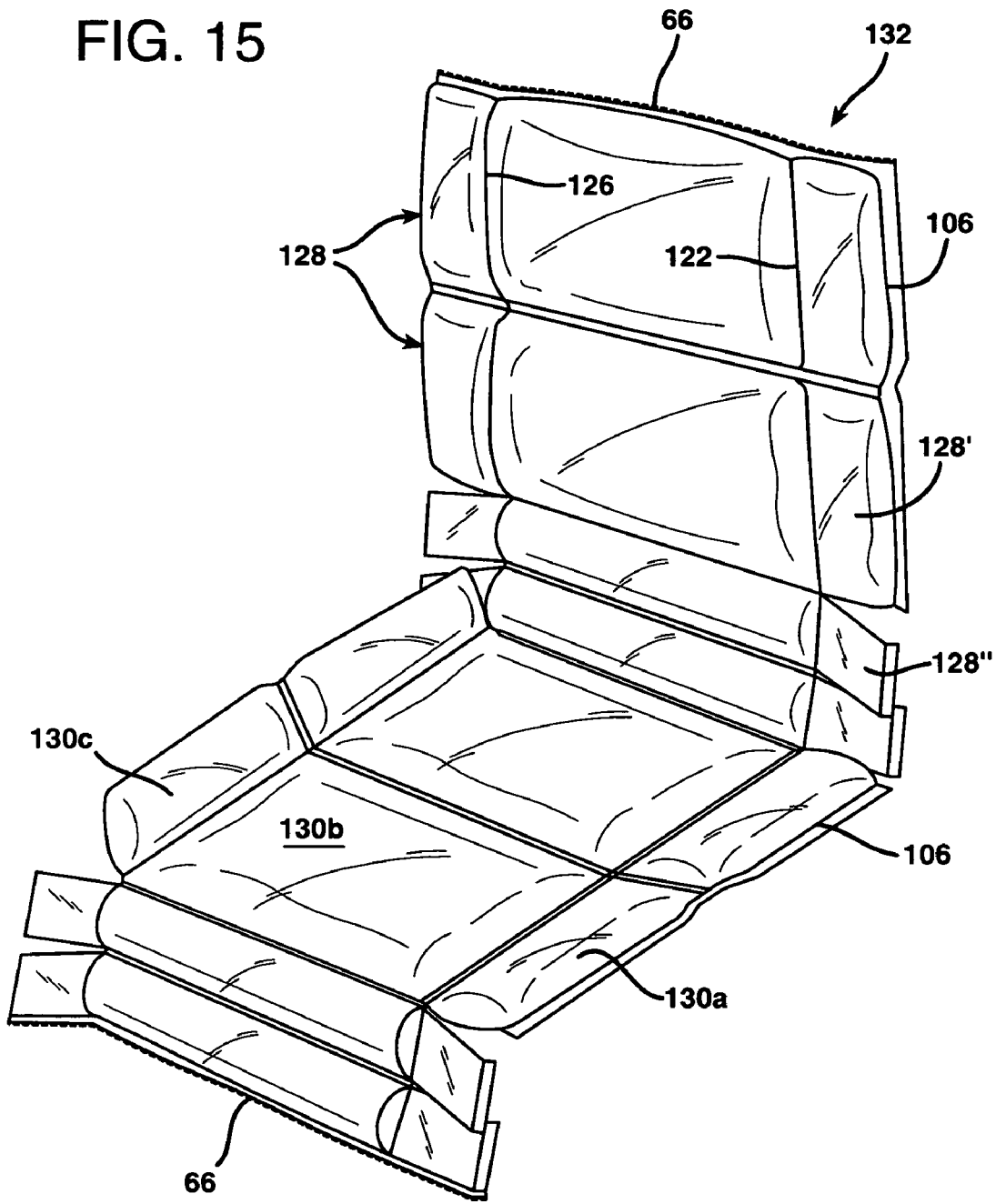
FIG. 15 is a perspective view of the cushion produced from the apparatus illustrated in FIG. 14.

Referring now to FIGS. 14-15, another optional feature of the present invention will be described, wherein apparatus 10 may further include additional sealing devices to create one or more additional longitudinal seals, i.e., in addition to longitudinal seal 106, in order to segment the inflated containers into discrete compartments. Thus, as shown in FIG. 14, apparatus 10' may, for example, additionally include a third sealing device 120 for producing longitudinal seal 122 and a fourth sealing device 124 for producing longitudinal seal 126 to segment the resultant inflated containers 128 into discrete compartments 130a-c. Third and fourth sealing devices 120, 124 may be the same as or different from the second sealing device 22, but preferably are capable of precluding longitudinal seals as shown. As with apparatus 10, first sealing device 20 of apparatus 10' (not shown in FIG. 14) may make the inflated containers 128 with different length dimensions, e.g., with inflated container 128' having a different (longer) length than inflated container 128" as shown.

A resultant cushion 132 from apparatus 10' is shown in FIG. 15. Each cushion 132 may comprise multiple inflated containers 128, some of which are longer containers 128' and some are shorter containers 128", with each type having discrete compartments 130a-c. As also shown, cushion 132 has been separated from other cushions, which may be the same as or different from cushion 132 but nevertheless made from the same film web 12, via 'inter-cushion' lines of weakness 66 only. That is, cushion 132 as depicted in FIG. 15 contains no 'intra-cushion' lines of weakness, i.e., no lines of weakness between inflated containers 128, which are components of cushion 132. As may be appreciated, cushion 132 may advantageously be used to substantially complete ensconce an article to be packaged, e.g., a rectangular-box-shaped article.

Figure 18:
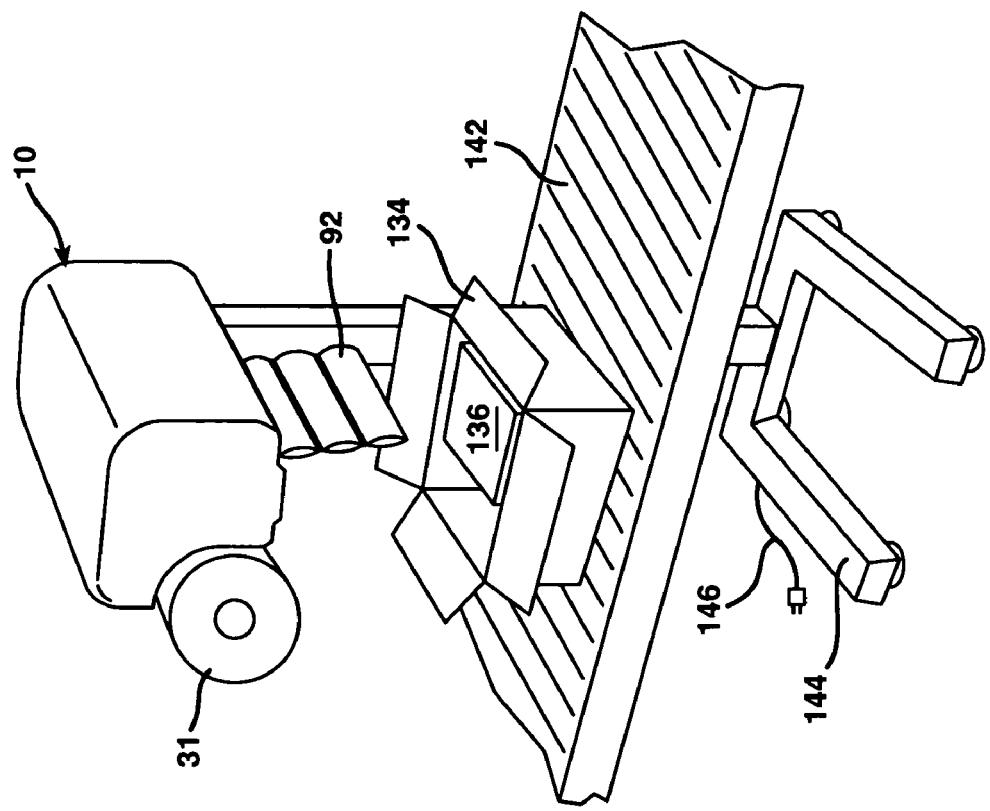
FIG. 18 is similar to FIG. 17, except that the box and article are positioned on a conveyor belt beneath the cushion-making apparatus.
Figure 17:
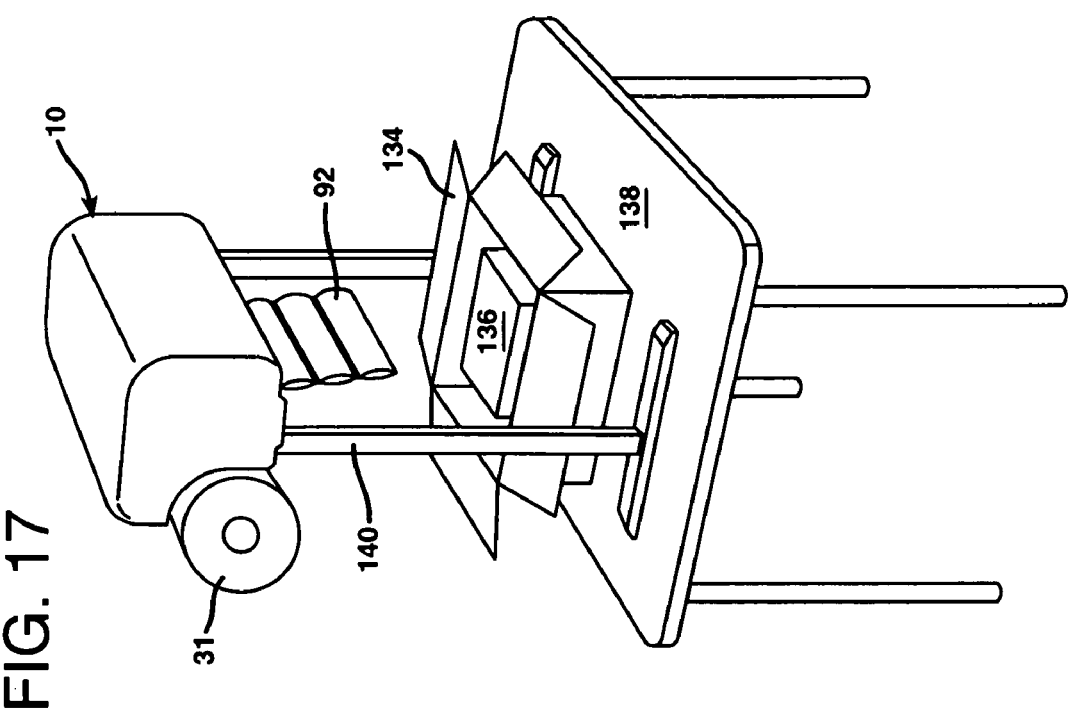
FIG. 17 is a perspective view of a cushion-making apparatus in accordance with the present invention in a typical packaging application, wherein an article to be packaged is placed in a box and positioned beneath the apparatus to collect a desired number of cushions to protect the article.

Various applications for apparatus 10 are shown FIGS. 17-20. In FIG. 17, apparatus 10 is shown dispensing inflated containers 92, all having the same dimensions, into box 134 with article 136 therein, wherein both the apparatus 10 and box 134 are mounted on a table 138. Apparatus is mounted on table 138 via table mount 140. FIG. 18 is similar to FIG. 17, except that box 134 with article 136 therein is disposed on conveyor belt 142, and apparatus 10 is supported beneath the conveyor belt, e.g., on the floor, via floor mount 144. FIG. 18 also shows an electrical power cord 146, which may be used to supply electrical power to apparatus 10, e.g., to operate the sealing devices 20, 22, motor 30, an air blower to supply air to inflation assembly 23, etc.

Figure 19:
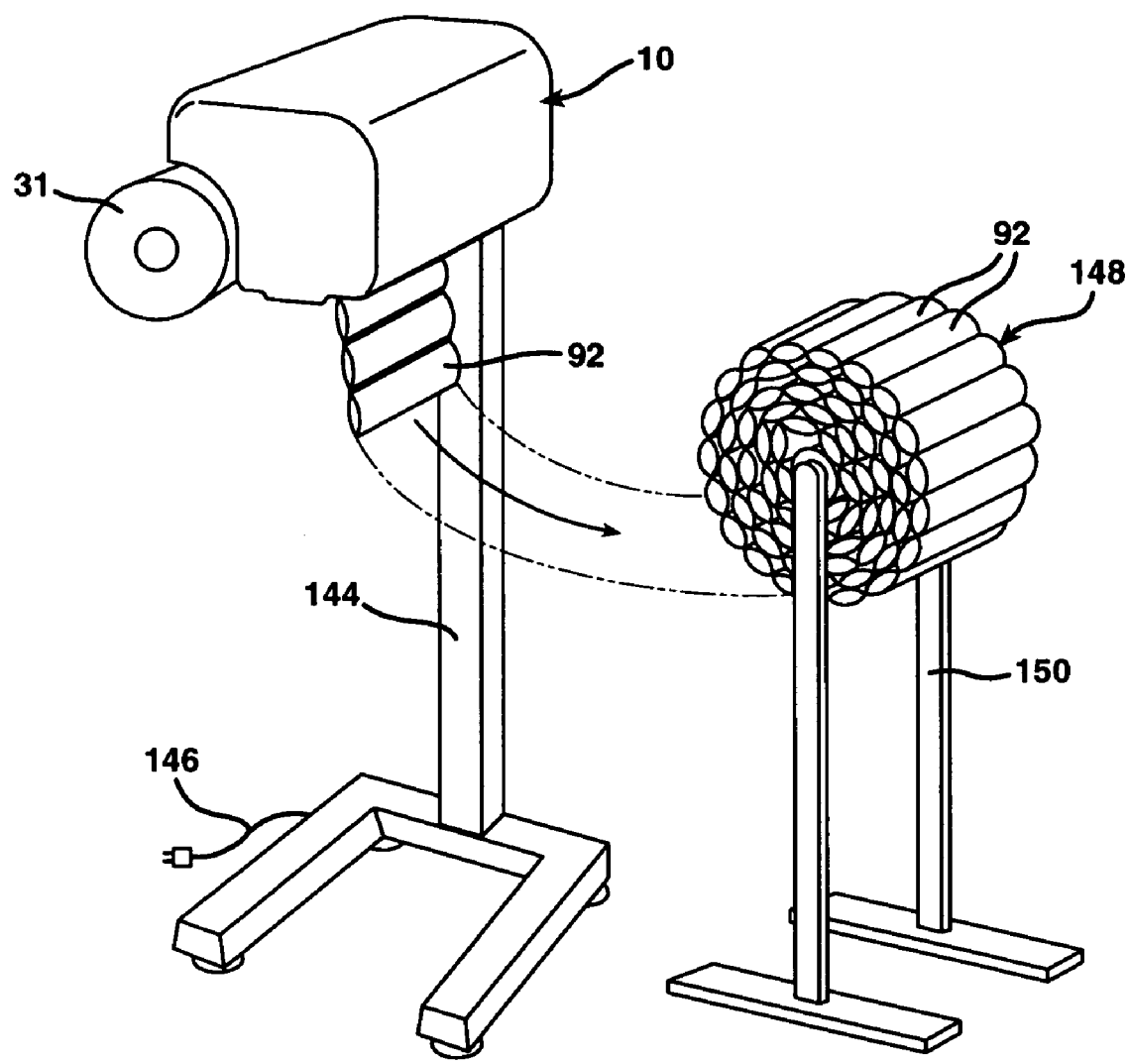
FIG. 19 illustrates another use for the inventive cushion-making apparatus, in which a string of cushions are formed and stored for later use on a storage roll.

FIG. 19 is similar to FIG. 18, except that a series of linked inflated containers 92 are being accumulated on a storage roll 148, supported by mounting stand 150, for future use.

Figure 20:
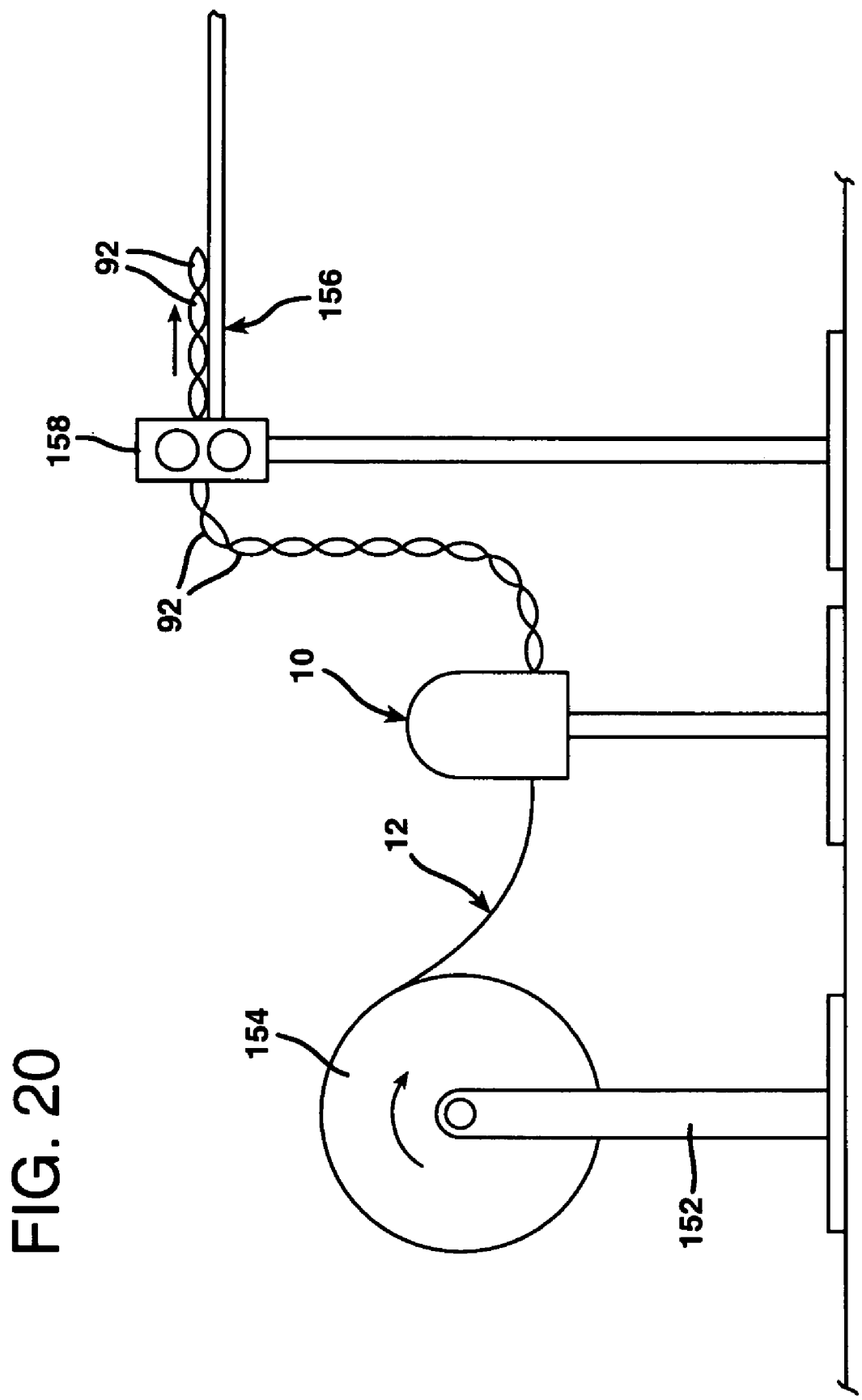
FIG. 20 illustrates yet another application for the inventive cushion-making apparatus, in which the relatively high-speed/high-capacity attributes of the apparatus are utilized to supply large quantities of inflated cushions to various packaging stations by employing a separate support for a relatively large roll of film web and by transporting the resulting string of cushions via an overhead conveyor system.

In FIG. 20, the relatively high-speed/high-capacity attributes of apparatus 10 is being utilized to supply large quantities of inflated containers 92 to remote packaging stations (not shown) by employing a separate support 152 for a relatively large roll 154 of film web 12, and by transporting the resulting string of containers 92 to the remote packaging stations via an overhead conveyor system 156, which may include entrance rollers 158 as shown.

Figure 21:
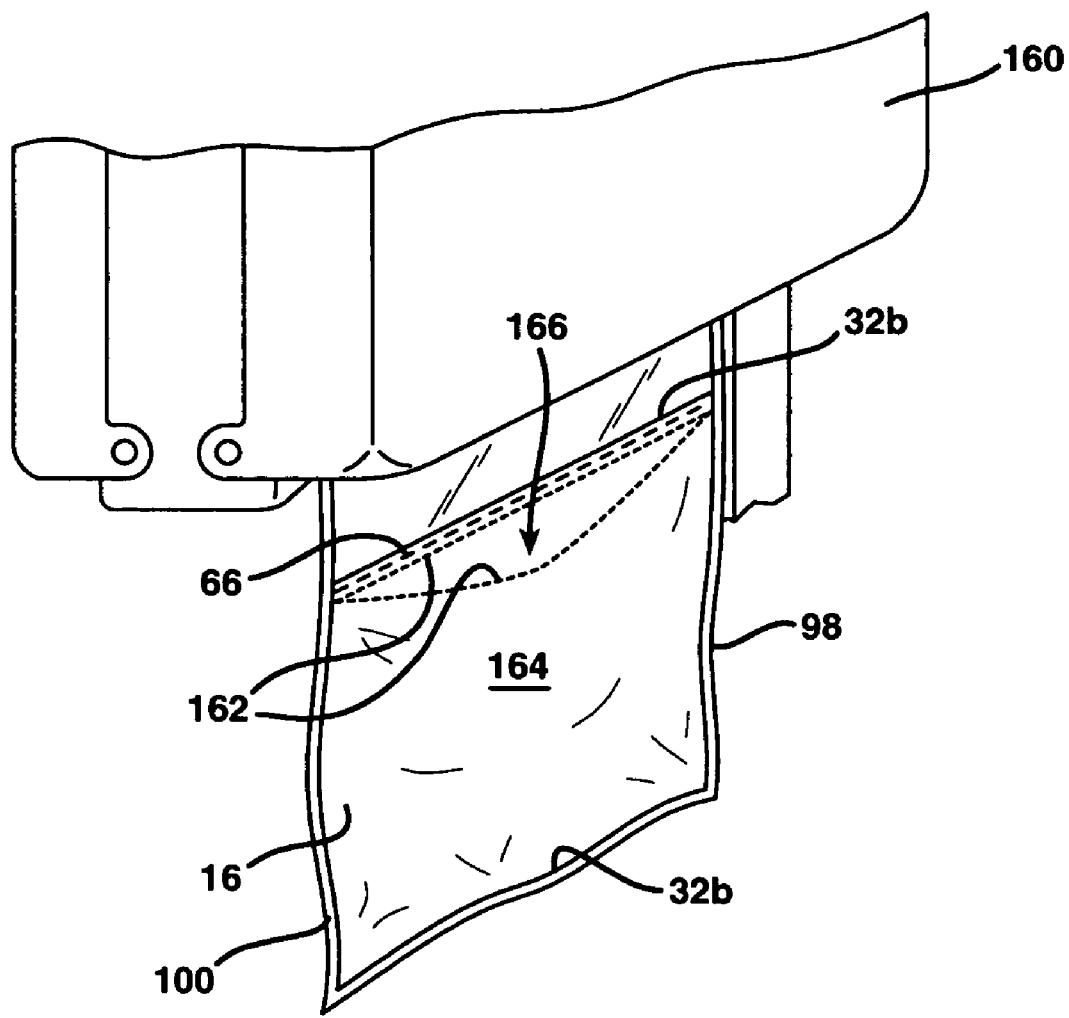
FIG. 21 illustrates an alternative application for the inventive apparatus in which the apparatus makes product containers having a line of weakness to provide access to the inside of the container.
Figure 22:
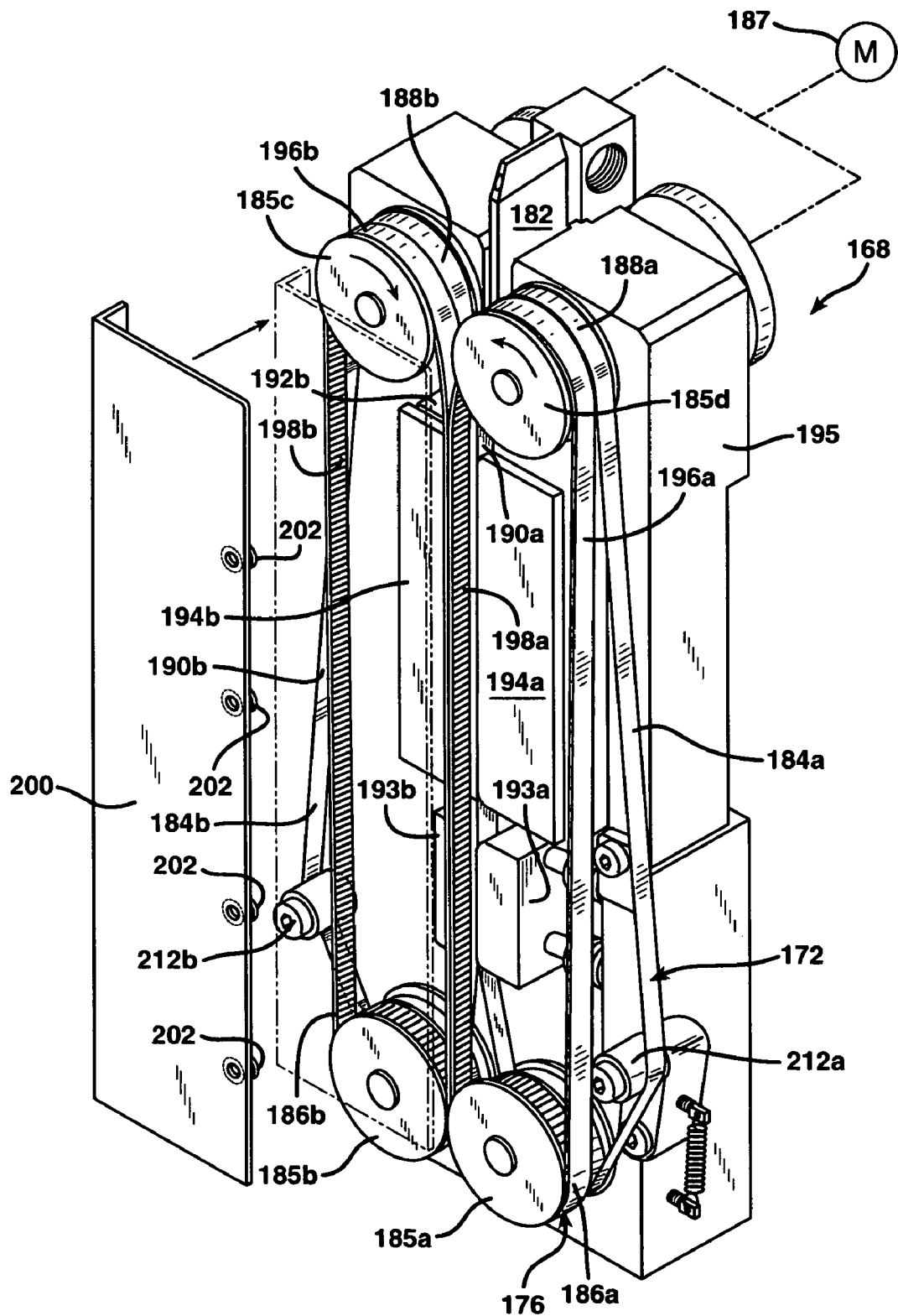
FIG. 22 is a perspective view of an alternative sealing device for making a longitudinal seal.

FIG. 21 illustrates an alternative apparatus 160, which is the same as apparatus 10 except that instead of forming leading-edge seal 32a, the first (movable) sealing device forms a partial line of weakness 162 in one of the film plies only, e.g., in film ply 16 as shown. Such partial line of weakness 162, which may be positioned adjacent to a "full" line of weakness 66 as discussed above, provides access to the inside of the resultant container 164. That is, partial line of weakness 162 allows the container 164 to be opened via resultant opening 166 as shown, whereby a product may be placed inside of the container. The partial line of weakness 162 may produced in the same manner as the "full" line of weakness 66 as described above, except that the serrations of the perforation blade would be set to a depth to penetrate through film ply 16 only, i.e., will not penetrate through both film plies 14 and 16, as is the case when making a full line of weakness 66.

The resultant containers 164 may be advantageously used with a suitable loading assembly (not shown) that directs a flowable product into the openings 166 of the containers 164, which may be produced in series as described above. A sealing device may then be used to seal closed the openings 166 in order to enclose the product inside of the containers 164.

Referring now to FIGS. 22-26, an alternative embodiment will be described for the second sealing device, i.e., the sealing device that forms a longitudinal seal to seal closed the containers. Similar to second sealing device 22 as discussed hereinabove, second sealing device 168 produces a longitudinal seal 106 between two juxtaposed plies of film 14, 16 that are conveyed along a longitudinal path of travel, the direction of which through second sealing device 168 is generally indicated by arrow 170 in FIGS. 24 and 25. As also described hereinabove, the juxtaposed film plies 14, 16 include a series of containers 34 therebetween. In accordance with the presently-described embodiment, second sealing device 168 includes a sealing mechanism 172 that forms a sealing zone 174 in the travel path in which longitudinal seal 106 is produced. Sealing device 168 also includes a pressure mechanism 176 that forms a pressure zone 178 in the film travel path in which the juxtaposed film plies 14, 16 are compressed. Sealing and pressure zones 174 and 178 are described in further detail below.

Figure 25:
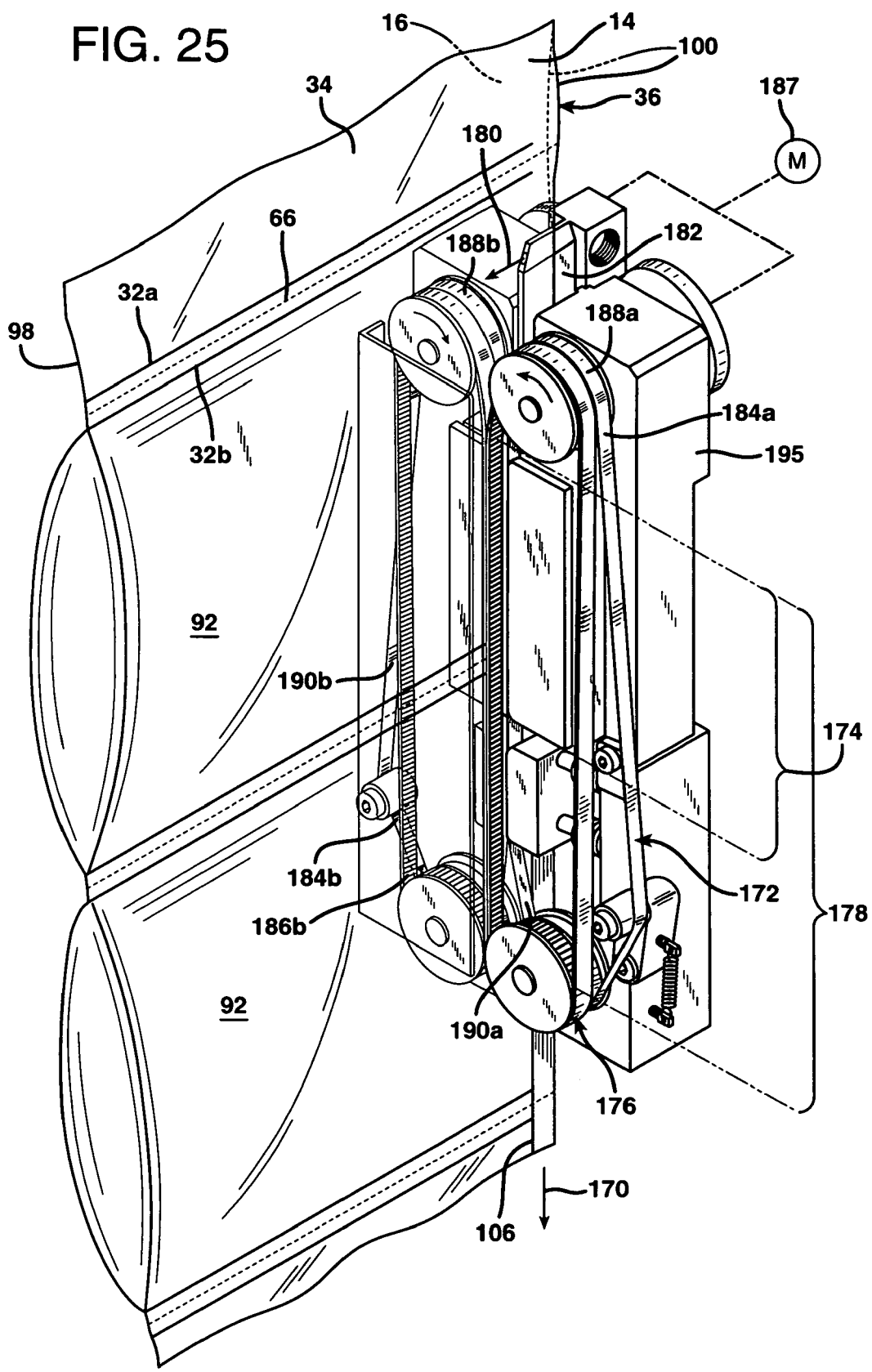
FIG. 25 is a perspective view of the device shown in FIG. 22 with a series of containers being inflated and sealed closed.

As noted above, the juxtaposed film plies 14, 16 may have an open longitudinal edge 100 that provides openings 36 into each of the containers 34. As illustrated in FIG. 25, a stream of gas 180 may be directed through openings 36 and into containers 34 by an inflation assembly 182 to sequentially inflate the containers 34. In this manner, inflated containers 92 are formed. Thus, as with second sealing device 22, sealing mechanism 172 forms longitudinal seal 106 at or near the longitudinal edge 100 to seal closed each of the openings 36 in the inflated containers 92.

Figure 24:
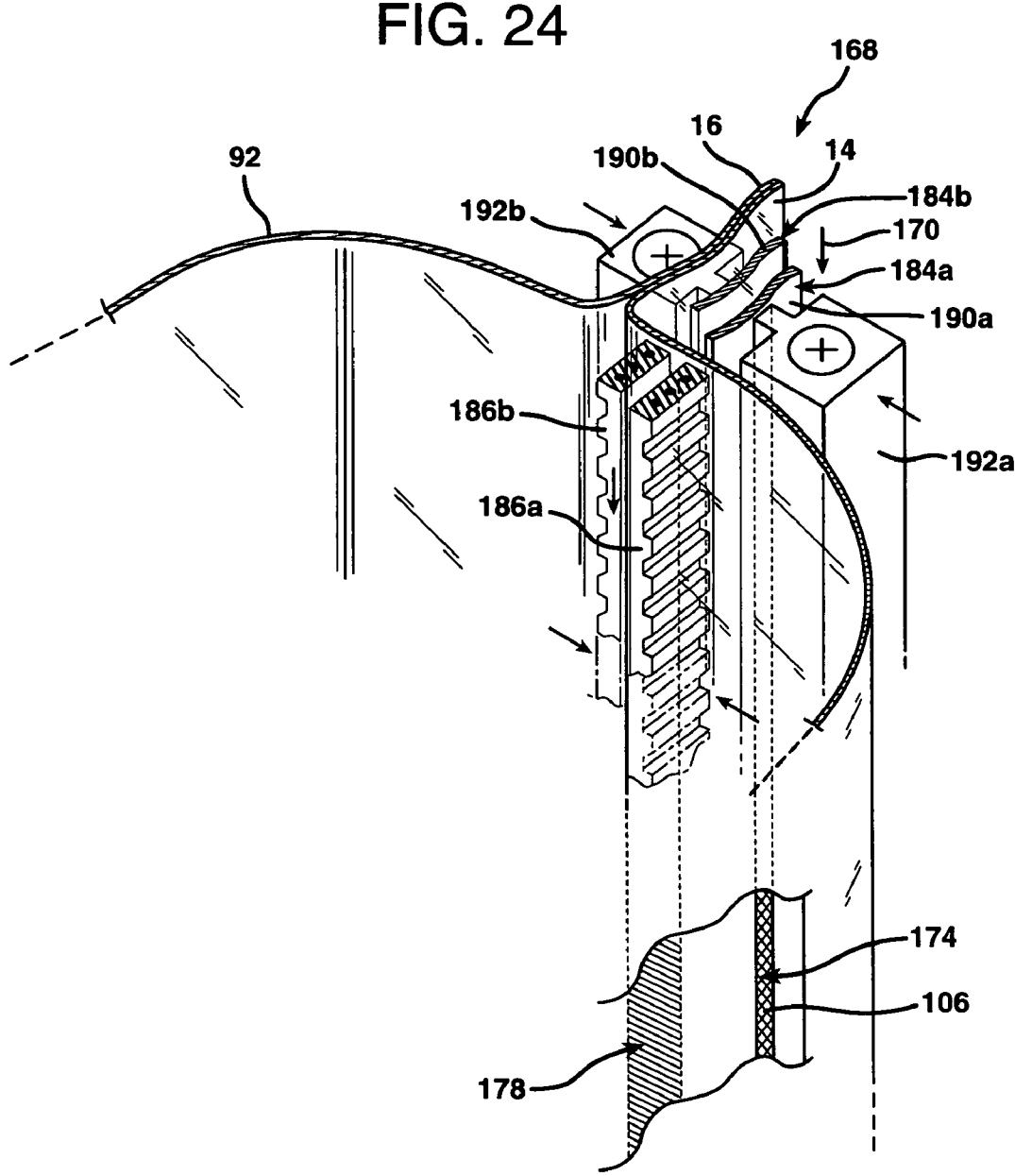
FIG. 24 is a partial, cut-away perspective view of an inflated container being sealed by the device shown in FIG. 22.

As perhaps best shown in FIGS. 24 and 25, pressure zone 178 is positioned between the containers 34 and the sealing zone 174 to substantially isolate the containers from the sealing zone. Such isolation has been found to improve the integrity of the longitudinal seals and increase the longevity of the sealing mechanism 172.

Sealing mechanism 172 may comprise a pair of sealing members 184a, b that converge within the travel path to form sealing zone 174. For example, sealing members 184a, b may comprise a pair of counter-rotating belts as shown, which may be guided and driven by rollers 185a-d. Rollers 185a and 185d may be driven by a motor, which is schematically indicated at 187. Thus, the belt-type sealing members 184a, b may rotate in opposite directions, may each have an outer surface 188a, b that contacts a respective one of the juxtaposed film plies 14, 16, and may also each have an inner surface 190a, b. Longitudinal seal 106 is preferably a heat seal, i.e., a thermally-induced weld between film plies 14, 16 along longitudinal seal 106 as shown. Accordingly, the belts are preferably formed from a material capable of transferring sufficient heat to film plies 14, 16 to form a heat seal therebetween, e.g., metal, which may optionally contain a non-stick coating on the outer surface 188a, b thereof, such as TEFLON or other fluorocarbon material.

Sealing device 168 may further include at least one heating unit capable of transferring heat to the inner surface 190a, b of at least one of the belt-type sealing members 184a, b. As illustrated, two such heating units 192a, b may be employed, one for each of the sealing members 184a, b. Such heating units 192a, b may be comprise any material, e.g., metal, that is capable of being heated sufficiently, e.g., via electrical resistive heating, to transfer enough heat through sealing members 184a, b to form longitudinal seal 106 between film plies 14, 16. The heating units 192a, b may transfer heat indirectly to respective sealing members 184a, b, e.g., via radiant or convective heat transfer, or directly as shown, i.e., by being in physical contact with respective inner surfaces 190a, b. As shown, heating units 192a, b are preferably disposed adjacent to the sealing zone 174.

Depending upon the type of materials used for film plies 14, 16, the amount of heat transferred through sealing members 184a, b, whether cooling blocks are present in the sealing zone, etc., actual formation of longitudinal seal 106 may only occur in that part of sealing zone 174 to which heating units 192a, b are adjacent. In this instance, the other parts of the sealing zone 174 nevertheless facilitate the formation of seal 106, e.g., by converging on the film plies upstream of heating units 192a, b to stabilize the film plies just prior seal formation and/or remaining in convergence with and cooling the seal just after it is formed to promote solidification thereof under relatively stable conditions. To this end, a pair of cooling blocks 193a, b may also be included as shown, i.e., just down stream of heating units 192a, b, to facilitate cooling and stabilization of the newly-formed seal 106 by maintaining pressure on inner surface 190a, b of sealing members 184a, b while also providing a heat sink to draw heat away from the sealing members and, therefore, away from the newly-formed seal 106.

Sealing device 168 may further include at least one, e.g., two as shown, compression units 194a, b, which are capable of contacting and applying pressure to the inner surface 190a, b of at least one of the pair of belt-type sealing members 184a, b. Such compression units 194a, b may be included to further stabilize the movement of sealing members 184a, b through sealing zone 174 and/or to further isolate the sealing members 184a, b from the inflating/inflated containers 92. In this regard, the compression units 194a, b may be disposed between heating units 192a, b and a respective one of the pressure members 186a, b. Preferably, the compression units 194a, b are disposed adjacent to sealing zone 174 as shown. (For the purpose of clarity, compression units 194a, b have been omitted from FIG. 24.) Compression units 194a, b may comprise simple plate-like structures that are urged against respective inner surfaces 190a, b of sealing members 184a, b as shown, or may be more elaborate structures, e.g., including rotatable contact members, such as a series of wheels, that make actual contact with the inner surfaces 190a, b.

Pressure mechanism 176 may comprise a pair of pressure members 186a, b that converge within the travel path to form pressure zone 178. Pressure members 186a, b may be substantially parallel with sealing members 184a, b as shown, particularly such that sealing zone 174 and pressure zone 178 are substantially parallel to one another.

Pressure members 186a, b may comprise a pair of counter-rotating belts as shown, which may be guided and driven by the same rollers 185a-d that guide and drive the rotation of belt-type sealing members 184a, b. Thus, the belt-type pressure members 186*a, b* may rotate about an outboard track on rollers 185*a-d* while belt-type sealing members 184*a, b* rotate about an inboard track (see FIG. 22). The terms "outboard" and "inboard" are used with reference to support structure 195, with the inboard track of belt-type sealing members 184*a, b* being closer to the wall 195 than the outboard track of belt-type pressure members 186*a, b.*

Accordingly, the belt-type pressure members 186*a, b* may rotate in opposite directions as shown, have respective outer surfaces 196*a, b* that contacts a respective one of the juxtaposed film plies 14, 16, and also have respective inner surfaces 198*a, b*. At least one compression unit 200 may be included, which is capable of contacting and applying pressure to the inner surface 198*a, b* of at least one of the pair of belt-type pressure members 186*a, b*. Preferably, two such compression units are included, one for each pressure member 186*a* and 186*b* (only one shown for clarity). Such compression units may be included to assist the pressure members 186*a, b* in applying a compressive force to the juxtaposed film plies 14, 16. Thus, the compression units 200 may advantageously be disposed adjacent to pressure zone 178 as shown. The compression units 200 may comprise simple plate-like structures that are urged against respective inner surfaces 198*a, b* of pressure members 186*a, b* or, as shown, may further include rotatable contact members, such as a vertically-disposed group of wheels 202, that make actual contact with the inner surfaces 198*a, b*. By virtue of their counter-rotation and contact with/exertion of pressure against film plies 14, 16, pressure members 186*a, b* may also serve to convey the film plies through pressure zone 178.

Advantageously, by interposing pressure zone 178 between the inflating/inflated containers 92 and the sealing zone 174, the integrity of longitudinal seal 106 may be improved. Such interposition is believed to substantially isolate the inflating/expanding containers 92 from sealing zone 174, thereby eliminating or at least reducing the tensioning force that the inflating containers would otherwise exert on the longitudinal seal as it is being formed. Such tensioning force results from air 180 being injected into the containers 92 via inflation assembly 182, which produces outward pressure on film plies 14, 16 from the interior of the containers. This force is in direct opposition to the binding force that seal 106 is intended to produce. Thus, the tensioning force exerted by the inflating containers has a tendency to weaken or disrupt the longitudinal seal as it is being formed. By isolating the inflating/expanding containers 92 from sealing zone 174, pressure mechanism 176 can substantially prevent such tensioning force from manifesting itself on the sealing mechanism 172 as it forms longitudinal seal 106.

The tensioning force from the expanding containers also has the effect of putting stress on the sealing mechanism itself, which is already under thermal stress from being subjected to numerous heating/cooling cycles. Thus, isolating the expanding containers 92 from sealing zone 174 also helps to maintain the effective service life of the sealing mechanism 172. In addition, such isolation helps to prevent inadvertent contact between the expanding sidewalls of the containers 92 and the sealing mechanism 172, which can otherwise cause deformation and/or deflation of the containers.

Figure 23:
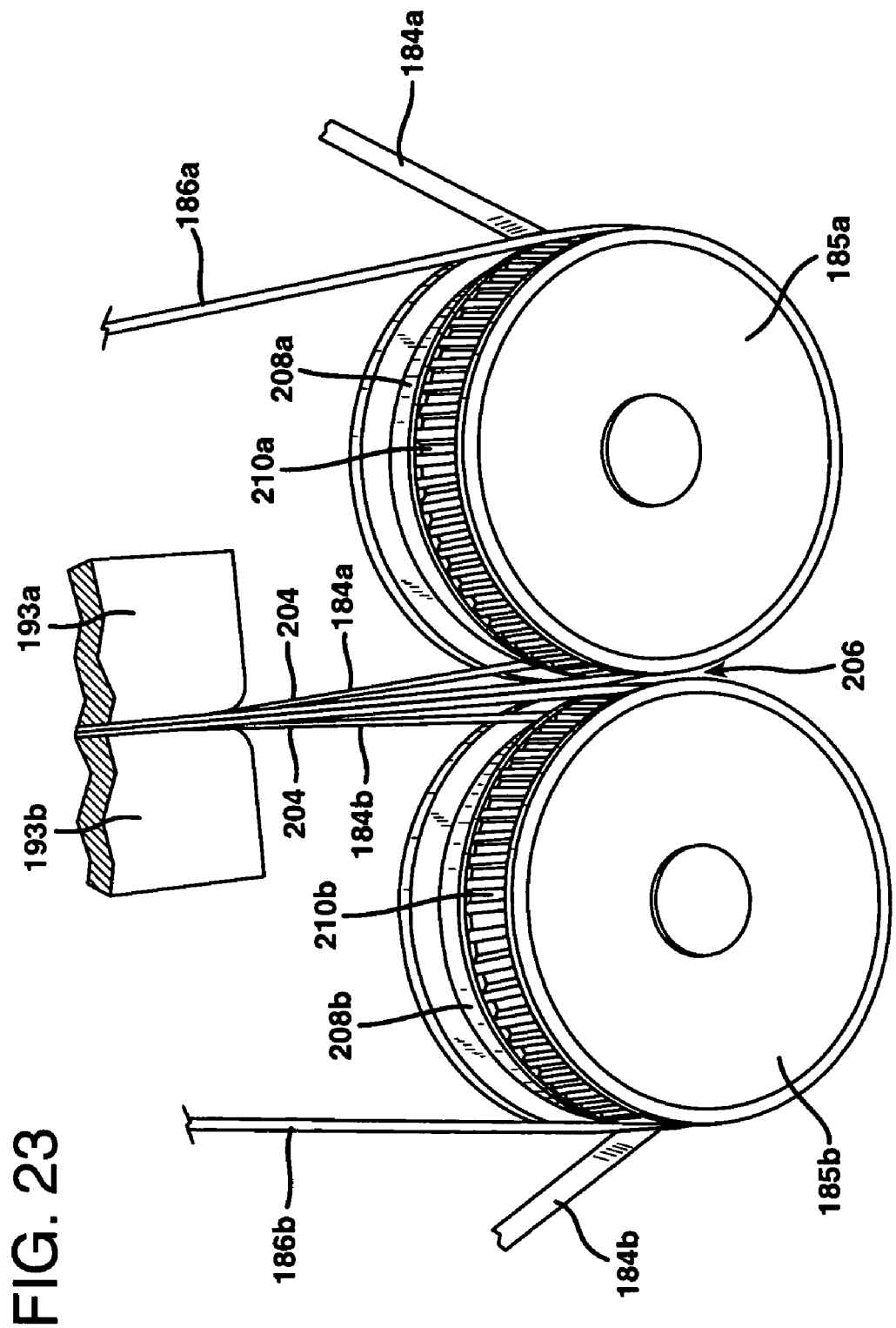
FIG. 23 illustrates the lower-most rollers of the device shown in FIG. 22.
Figure 26:
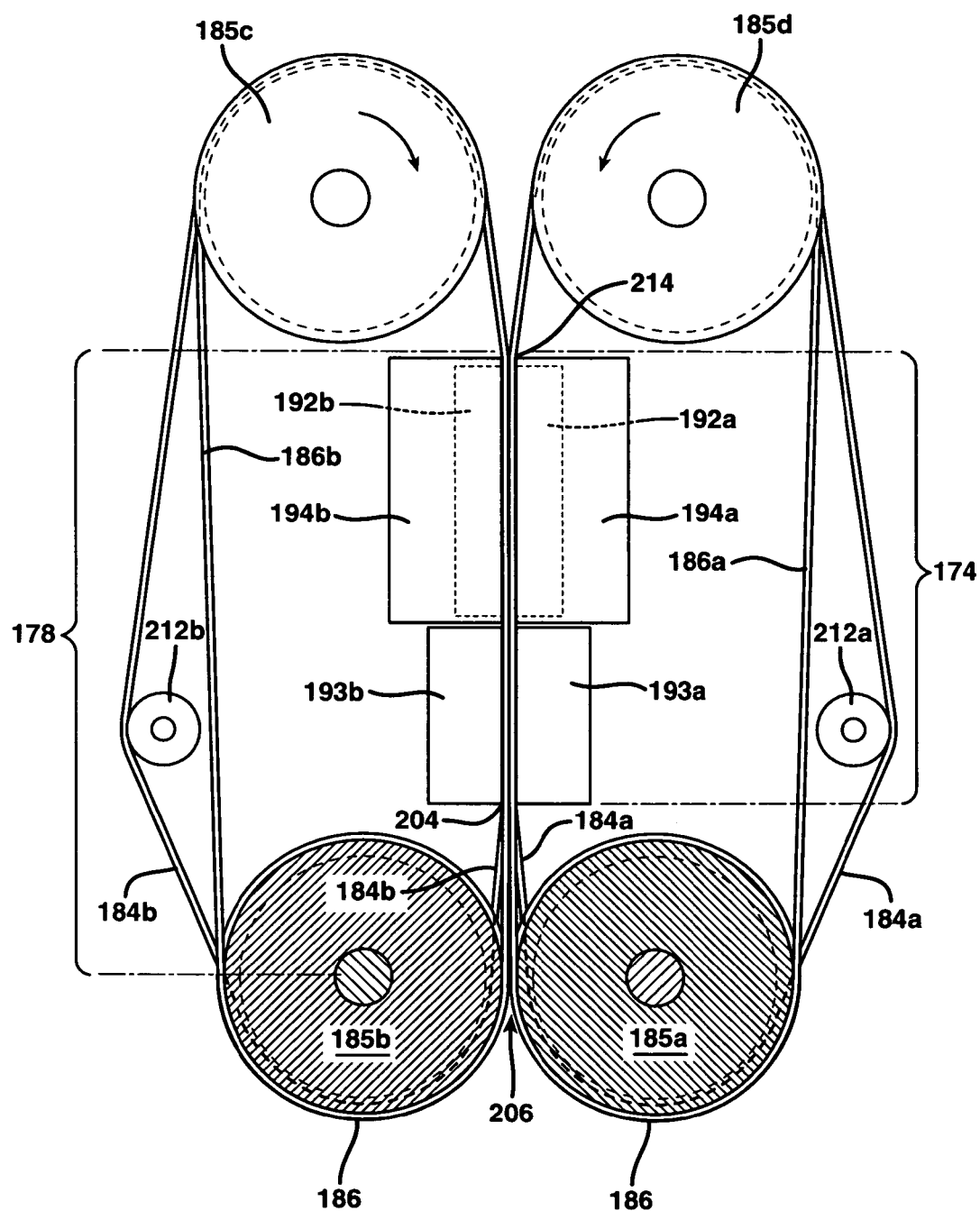
FIG. 26 is a schematic plan view of the device shown in FIG. 22.

With particular reference to FIGS. 23 and 26, it may be seen that sealing zone 174 and pressure zone 178 both have separate points of termination, with the sealing zone terminating at 204 and the pressure zone terminating at 206. Advantageously, sealing zone 174 may terminate at point 204, which is upstream of the point 206 at which pressure zone 178 terminates as shown. This has been found to facilitate the release of the sealing members 184*a, b* from the film plies 14, 16, e.g., without sticking to the film plies, as can happen when sealing mechanism 172 is heated. In other words, by extending the pressure zone 178 farther downstream of the sealing zone 174, the relatively cool pressure mechanism 176 has the effect of continuously pulling the film plies from the relatively warm sealing zone 174 at termination point 204.

The termination of the seal zone upstream of the pressure zone may be accomplished as shown by causing the sealing members 184*a, b* to diverge upstream, at 204, of the point at which the pressure members 186*a, b* diverge, which occurs at 206. Upstream divergence of sealing members 184*a, b* may be achieved by providing rollers 185*b* and *c* with a smaller diameter on the inboard track 208*a, b* than on the outboard track 210*a, b* (see FIG. 23). Since sealing members 184*a, b* rotate about the inboard track, they diverge from the travel path prior to the divergence of pressure members 186*a, b*. As shown, divergence of sealing members 184*a, b* at 204 generally occurs just downstream of the cooling blocks 193*a, b*; pressure members 186*a, b* may diverge downstream at 206, which is the point of tangential contact between rollers 185*a* and 185*b*.

By taking a smaller-diameter track at rollers 185*a, b*, outwardly biased idler wheels 212*a, b* may advantageously be employed to give sealing members 184*a, b* essentially the same path-length as pressure members 186*a, b*. As shown, both the sealing members 184*a, b* and pressure members 186*a, b* converge upstream of their respective points of divergence 204 and 206; such convergence points may occur at substantially the same point, indicated at 214, along the travel path. If desired, the points of divergence 204 and 206 could also occur at the same point along the travel path.

Second sealing device 168 may be used in place of second sealing device 22 in apparatus 10 or, alternatively, may be used in any other apparatus for making inflated containers from a film web having two juxtaposed film plies. More generally, sealing device 168 may be used in any system that seals two juxtaposed film plies together.

As noted above, an alternative to first sealing device 20 may include a clamping member 216 as shown in FIG. 27, which may be used to produce an inflated cushion 217 having the seal pattern shown in FIG. 28. Clamping member 216 may be identical to clamping member 42, except that clamping member 216 includes a substantially linear sealing element 218 having one or more non-linear regions 220. As shown, a pair of sealing elements 218*a, b* may be employed. Sealing elements 218*a, b* function in the same manner as sealing elements 62*a, b* on clamping member 42, except that the resultant containers 222 have at least one change in longitudinal dimension along their transverse width.

That is, like clamping member 42, clamping member 216 may be used on a sealing device that produces a series of seals 224 that are substantially transverse to the longitudinally-extending edges 98 and 100 of the film web 12. A pair of seals 224*a, b* may be made simultaneously by clamping member 216, with seal 224*a* corresponding to sealing element 218*a* and seal 224*b* corresponding to sealing element 218*b*. Such transverse seals 224 bond the film plies 14, 16 together to form containers 222 having a predetermined transverse width "W." Containers 222 also have at least one change in longitudinal dimension along their transverse width W, and at least one opening 226.

Thus, for example, containers 222 may have two different longitudinal dimensions, L1 and L2 as shown, with alternating changes occurring between those two dimensions along the transverse width W of each container. Dimension L1 corresponds to the space between sealing elements 218*a, b* at the substantially linear regions 228 thereof, while the smaller dimension L2 corresponds to the smaller space between the non-linear regions 220 of sealing elements 218a, b. In use, the portions of the container having the larger dimension L1 provide cushioning while the portions having the smaller dimension L2 provide flexibility to the cushion 217, e.g., to allow it to be bent or folded at such smaller dimension portions in order to wrap around and more closely follow the contour of an object to be packaged.

Although the non-linear regions 220 are illustrated as having a curved, semi-circular shape, the non-linear regions can have any shape that deviates from the otherwise lineal shape of the sealing elements 218 in order to create containers having at least one change in longitudinal dimension along their transverse width W.

Clamping member 216 can be used as part of first sealing device 20 as described above, wherein the sealing device is adapted to move with the film web and produce transverse seals as the web is conveyed along the travel path, e.g., by attaching itself to the film web. More generally, however, clamping member 216 may be incorporated into any sealing device that is employed on an apparatus for making inflated containers from a film web comprising two juxtaposed film plies, wherein the apparatus includes a mechanism that conveys the film web along a longitudinal path of travel, such as conveying mechanism 18; an inflation assembly, such as inflation assembly 23 or 182, for inflating the containers 222 by directing a stream of gas into the openings 226 thereof; and a second sealing device, such as device 22 or 168, for producing a longitudinal seal 106 to seal closed the openings 226 of the inflated containers 222.

If desired, each container 222 may be separated by a line of weakness 66 as shown. Alternatively, groups of two or more such containers may be separated by a line of weakness, i.e., not every container 222 need be separated by a line of weakness. Further, the longitudinal dimension L1 can vary between any two adjacent containers as desired.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A method for making inflated containers from a film web having two juxtaposed film plies, comprising:
    a. conveying the film web along a path of travel;
    b. producing first and second spaced-apart seals that bond the film plies together to form a series of containers having at least one opening by moving a sealing device with the film web to produce said first and second seals substantially simultaneously as the web is conveyed along the travel path, said sealing device also forming a line of weakness between first and second seals of adjacent containers in said series;
    c. directing a stream of gas into the opening of the containers to inflate said containers; and
    d. sealing closed the opening of the inflated containers.

2. An apparatus for making inflated containers from a film web having two juxtaposed film plies, comprising:
    a. a mechanism that conveys the film web along a path of travel;
    b. a first sealing device for producing first and second spaced-apart seals that bond the film plies together to form a series of containers having at least one opening, wherein, said first sealing device moves with the film web and produces said first and second seals substantially simultaneously as the web is conveyed along the travel path, and includes means for forming a line of weakness between first and second seals of adjacent containers in said series;
    c. an inflation assembly for inflating the containers by directing a stream of gas into the opening thereof; and
    d. a second sealing device for sealing closed the opening of the inflated containers.

3. The apparatus of claim 2, wherein said first sealing device attaches itself to the film web.

4. The apparatus of claim 2, wherein said conveying mechanism moves both the film web and said first sealing device along the travel path.

5. The apparatus of claim 2, wherein said first sealing device is moved along the travel path by a conveying mechanism that is separate from said conveying mechanism for said film.

6. The apparatus of claim 2, wherein said first sealing device includes a pair of clamping members, which engage opposing surfaces of the film web and exert a compressive force to squeeze the film web between said clamping members, thereby attaching the first sealing device to the film web.

7. The apparatus of claim 2, wherein said first sealing device attaches itself to the film web at a starting position, produces said first and second seals while attached to the film web as the web is conveyed along the travel path, then disengages from the film web and returns to said starting position.

8. The apparatus of claim 7, wherein said first sealing device returns to said starting position by force of gravity.

9. The apparatus of claim 2, wherein the film web continues to move along the travel path without stopping as the first sealing device produces said first and second seals.

10. The apparatus of claim 2, wherein said apparatus further includes a device for forming one or more lines of weakness between each container or between groups of two or more containers.

11. The apparatus of claim 10, wherein said device for forming one or more lines of weakness is affixed to said first sealing device.

12. The apparatus of claim 2, wherein said apparatus makes inflated containers of substantially the same dimension.

13. The apparatus of claim 2, wherein said apparatus makes inflated containers of varying dimension such that two or more adjacent containers in the film web have different dimensions.

14. The apparatus of claim 2, wherein said apparatus makes a repeating pattern of inflated containers, wherein two or more containers in said pattern are dimensioned differently from one another.

15. The apparatus of claim 2, wherein
    the film web has a closed longitudinal edge and an opposing open longitudinal edge;
    said first and second seals are substantially transverse and define, along with the closed longitudinal edge of the film web, the containers; and
    the open longitudinal edge provides said at least one opening into the containers.

16. The apparatus of claim 15, wherein
    the inflation assembly includes a nozzle from which the stream of gas exits the inflation assembly, said nozzle protruding into the open longitudinal edge of the film web to inflate the containers; and the second sealing device forms a third, substantially longitudinal seal that intersects the first and second transverse seals, thereby sealing closed the opening of the inflated containers.

17. The apparatus of claim 16, wherein
the first and second transverse seals extend from the closed longitudinal edge of the film web and terminate a predetermined distance from the open longitudinal edge such that each of the juxtaposed film plies have flanges that are not bonded together, said flanges extending along the open longitudinal edge; and
at least a portion of the nozzle is positionable between the flanges so that, as said conveying mechanism conveys the web along the travel path, the nozzle moves longitudinally between the flanges.

18. The apparatus of claim 15, further including a controller to control the actuation of the first sealing device, said controller being operative to cause the first sealing device to form the first and second transverse seals with a specified amount of spacing within a given container, thereby producing containers with a specified length dimension.

19. The apparatus of claim 18, wherein the apparatus is adapted to make any two adjacent containers with a different length dimension.

20. The apparatus of claim 2, wherein said first sealing device makes substantially linear seals.

21. The apparatus of claim 2, wherein said first sealing device makes substantially non-linear seals.

22. The apparatus of claim 2, further including a third sealing device for producing one or more seals that segment the inflated containers into discrete compartments.

23. The apparatus of claim 2, wherein said second sealing device comprises:
a. a sealing mechanism that forms a sealing zone in said travel path in which a longitudinal seal is produced to seal closed the opening of the inflated containers; and
b. a pressure mechanism that forms a pressure zone in said travel path in which the juxtaposed film plies are compressed, said pressure zone positioned between the containers and said sealing zone to substantially isolate the containers from said sealing zone.

24. An apparatus for making inflated containers from a film web having two juxtaposed film plies, comprising:
a. a mechanism that conveys the film web along a path of travel;
b. a first sealing device for producing one or more seals that bond the film plies together to form a container having at least one opening, said first sealing device moving with the film web and producing said one or more seals as the web is conveyed along the travel path, wherein said first sealing device attaches itself to the film web at a starting position, produces said one or more seals while attached to the film web as the web is conveyed along the travel path, then disengages from the film web and returns to said starting position by force of gravity;
c. an inflation assembly for inflating the container by directing a stream of gas into the opening thereof; and
d. a second sealing device for sealing closed the opening of the inflated container.

25. An apparatus for making inflated containers from a film web having two juxtaposed film plies, comprising:
a. a mechanism that conveys the film web along a path of travel;
b. a first sealing device for producing first and second spaced-apart seals that bond the film plies together to form a series of containers having at least one opening, said first sealing device moving with the film web and producing said one or more seals as the web is conveyed along the travel path;
c. a controller to control the actuation of said first sealing device, said controller being operative to cause the first sealing device to form the first and second seals with a specified amount of spacing within a given container, thereby producing containers such that any two adjacent containers in said series of containers have the same length dimension or a different length dimension, as determined by said controller;
d. an inflation assembly for inflating the containers by directing a stream of gas into the opening thereof; and
e. a second sealing device for sealing closed the opening of the inflated containers.

* * * * *